United States Patent
Kusashima et al.

(10) Patent No.: US 11,357,016 B2
(45) Date of Patent: Jun. 7, 2022

(54) BASE STATION DEVICE, TERMINAL DEVICE, AND METHOD

(71) Applicant: SONY CORPORATION, Tokyo (JP)

(72) Inventors: Naoki Kusashima, Kanagawa (JP); Hiromasa Uchiyama, Tokyo (JP); Hiroki Matsuda, Tokyo (JP); Yifu Tang, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/959,742

(22) PCT Filed: Oct. 16, 2018

(86) PCT No.: PCT/JP2018/038415
§ 371 (c)(1),
(2) Date: Jul. 2, 2020

(87) PCT Pub. No.: WO2019/138630
PCT Pub. Date: Jul. 18, 2019

(65) Prior Publication Data
US 2020/0374892 A1 Nov. 26, 2020

(30) Foreign Application Priority Data

Jan. 11, 2018 (JP) .............................. JP2018-002387

(51) Int. Cl.
*H04W 72/08* (2009.01)
*H04W 16/14* (2009.01)
(Continued)

(52) U.S. Cl.
CPC ......... *H04W 72/085* (2013.01); *H04W 16/14* (2013.01); *H04W 28/0268* (2013.01); *H04W 28/22* (2013.01)

(58) Field of Classification Search
None
See application file for complete search history.

(56) References Cited

U.S. PATENT DOCUMENTS

| 2012/0099559 A1 | 4/2012 | Yoshizawa et al. |
| 2016/0014779 A1 | 1/2016 | Hu et al. |
| (Continued) | | |

FOREIGN PATENT DOCUMENTS

| CA | 3009728 A1 | 8/2017 |
| CN | 103763708 A | 4/2014 |
| (Continued) | | |

OTHER PUBLICATIONS

Extended European Search Report of EP Application No. 18899502.1 dated Dec. 9, 2020, 08 pages.
(Continued)

*Primary Examiner* — Hong Shao
(74) *Attorney, Agent, or Firm* — Chip Law Group

(57) ABSTRACT

To provide a mechanism in which a plurality of base station devices operated by different operators, respectively, can share a radio resource while cooperating with each other. A base station device includes: a control unit that transmits, to another base station device operated by an operator different from an operator operating the base station device, first configuration information of a first guaranteed resource that is preferentially usable by the base station device among radio resources that are sharable between the operator operating the base station device and the operator operating the other base station device.

20 Claims, 11 Drawing Sheets

(51) Int. Cl.
*H04W 28/02* (2009.01)
*H04W 28/22* (2009.01)

(56) References Cited

U.S. PATENT DOCUMENTS

| | | | |
|---|---|---|---|
| 2017/0013468 A1 | 1/2017 | Zhu et al. | |
| 2017/0265082 A1* | 9/2017 | Jiang | H04W 72/042 |
| 2017/0325115 A1* | 11/2017 | Matsumoto | H04W 16/14 |

FOREIGN PATENT DOCUMENTS

| | | |
|---|---|---|
| CN | 106537966 A | 3/2017 |
| EP | 3099096 A1 | 11/2016 |
| EP | 3167649 A1 | 5/2017 |
| JP | 2010-206820 A | 9/2010 |
| JP | 2016/121672 A | 8/2018 |
| JP | 6393401 B2 | 9/2018 |
| KR | 10-2017-0016941 A | 2/2017 |
| WO | 2015/110072 A1 | 7/2015 |
| WO | 2016/005813 A1 | 1/2016 |
| WO | 2016/121672 A1 | 8/2016 |
| WO | 2017/130494 A1 | 8/2017 |
| WO | 2016/121672 A | 8/2018 |

OTHER PUBLICATIONS

"Revised SID on NR-based Access to Unlicensed Spectrum", Qualcomm Incorporated, 3GPP TSG RAN, 77th Meeting, Sapporo, Japan, RP-172021, Sep. 11-14, 2017, 05 pages.

"Revised Study on NR-Based Access To Unlicensed Spectrum", 3GPP TSG RAN Meeting #77, RP-172021 Sapporo, Japan, Qualcomm Incorporated, Sep. 11-14, 2017, 5 pages.

"Study on NR-based Access to Unlicensed Spectrum", 3GPP TSG RAN Meeting #77, RP-172021, Sapporo, Japan, Qualcomm Incorporated, Sep. 11-14, 2017, 5 pages.

International Search Report and Written Opinion of PCT Application No. PCT/JP2018/038415, dated Dec. 11, 2018, 13 pages of ISRWO.

* cited by examiner

BASE STATION DEVICE, TERMINAL DEVICE, AND METHOD

CROSS REFERENCE TO RELATED APPLICATIONS

This application is a U.S. National Phase of International Patent Application No. PCT/JP2018/038415 filed on Oct. 16, 2018, which claims priority benefit of Japanese Patent Application No. JP 2018-002387 filed in the Japan Patent Office on Jan. 11, 2018. Each of the above-referenced applications is hereby incorporated herein by reference in its entirety.

FIELD

The present disclosure relates to a base station device, a terminal device, and a method.

BACKGROUND

A radio access scheme and radio network of cellular mobile communication (hereinafter, also referred to as "Long Term Evolution (LTE)", "LTE-Advanced (LTE-A)", "LTE-Advanced Pro (LTE-A Pro)", "New Radio (NR)", "New Radio Access Technology (NRAT)", "5G", "Evolved Universal Terrestrial Radio Access (EUTRA)", or "Further EUTRA (FEUTRA)") has been studied in 3rd Generation Partnership Project (3GPP). Note that, in the following description, the LTE includes the LTE-A, the LTE-A Pro, and the EUTRA, and the NR includes the NRAT and the FEUTRA. In the LTE, a base station device (base station) is also referred to as evolved NodeB (eNodeB), in the NR, the base station device (base station) is also referred to as gNodeB, and in the LTE and the NR, a terminal device (mobile station, mobile station device, or terminal) is also referred to as user equipment (UE). The LTE and the NR are cellular communication systems in which a plurality of areas covered by a base station device are arranged in a cell shape. A single base station device may manage a plurality of cells.

The NR is a next-generation radio access scheme for the LTE, and is a radio access technology (RAT) different from the LTE. The NR is an access technology that can support various use cases including enhanced mobile broadband (eMBB), massive machine type communications (mMTC), and ultra reliable and low latency communications (URLLC). The NR has been studied for a technical framework that addresses usage scenarios, requirements, arrangement scenarios, and the like in those use cases.

The operation of the radio access scheme based on cellular communication in an unlicensed band and a license shared band has been studied. In such an unlicensed band, coexistence with other nodes or wireless systems is considered important, and a function such as Listen Before Talk (LBT) in which channel sensing is performed before transmission, or discontinuous transmission is required for the radio access scheme such as the LTE or the NR. Details of a radio access scheme based on the NR in the unlicensed band are disclosed in Non Patent Literature 1. Note that the unlicensed band is, for example, 2.4 GHz, 5 GHz, or 6 GHz. The license shared band is, for example, 3.5 GHz or 37 GHz.

Generally, in a spectrum shared by different operators, such as an unlicensed band and a license shared band, transmission is performed according to a concept called Listen Before Talk (LBT) in order to maintain fairness of transmission opportunities. The operator is a communication carrier that has a network for performing mobile communication and provides mobile communication services. According to the LBT, a transmitting device performs carrier sensing before transmission, ascertains whether or not a channel is idle, and performs transmission after acquiring a channel access right. From the viewpoint of channel fairness, the transmitting device often occupies a channel when data to be transmitted are generated, and releases the channel once transmission performed for a certain period of time ends.

CITATION LIST

Non Patent Literature

Non Patent Literature 1: RP-172021, "Study on NR-based Access to Unlicensed Spectrum," 3GPP TSG RAN Meeting #77, Sapporo, Japan, Sep. 11 to 14, 2017.

SUMMARY

Technical Problem

In a case where a plurality of base station devices operated by different operators, respectively, are independently operated and share a radio resource (frequency resource and time resource), it can be difficult to appropriately share a frequency in the LBT framework described above.

Therefore, a mechanism, in which a plurality of base station devices operated by different operators, respectively, can share a radio resource while cooperating with each other, is provided.

Solution to Problem

According to the present disclosure, a base station device is provided that includes: a control unit that transmits, to another base station device operated by a second operator different from a first operator operating the base station device, first configuration information of a first guaranteed resource that is preferentially usable by the base station device among radio resources that are sharable between the first operator and the second operator.

Moreover, according to the present disclosure, a terminal device is provided that includes: a control unit that performs communication with a base station device operated by a first operator by using a radio resource that is sharable between the first operator and a second operator different from the first operator, and reports, to the base station device, a result of measurement of a signal from another base station device operated by the second operator.

Moreover, according to the present disclosure, a method performed by a base station device is provided that includes: transmitting, to another base station device operated by a second operator different from a first operator operating the base station device, first configuration information of a first guaranteed resource that is preferentially usable by the base station device among radio resources that are sharable between the first operator and the second operator.

Advantageous Effects of Invention

As described above, according to the present disclosure, a mechanism, in which a plurality of base station devices operated by different operators, respectively, can share a radio resource while cooperating with each other, is provided. Note that the effects are not necessarily limited to those described above, and any effect shown in the present specification or other effects that can be grasped from the present specification may be exerted together with or in place of the above-described effects.

DESCRIPTION OF EMBODIMENTS

Figure 1:
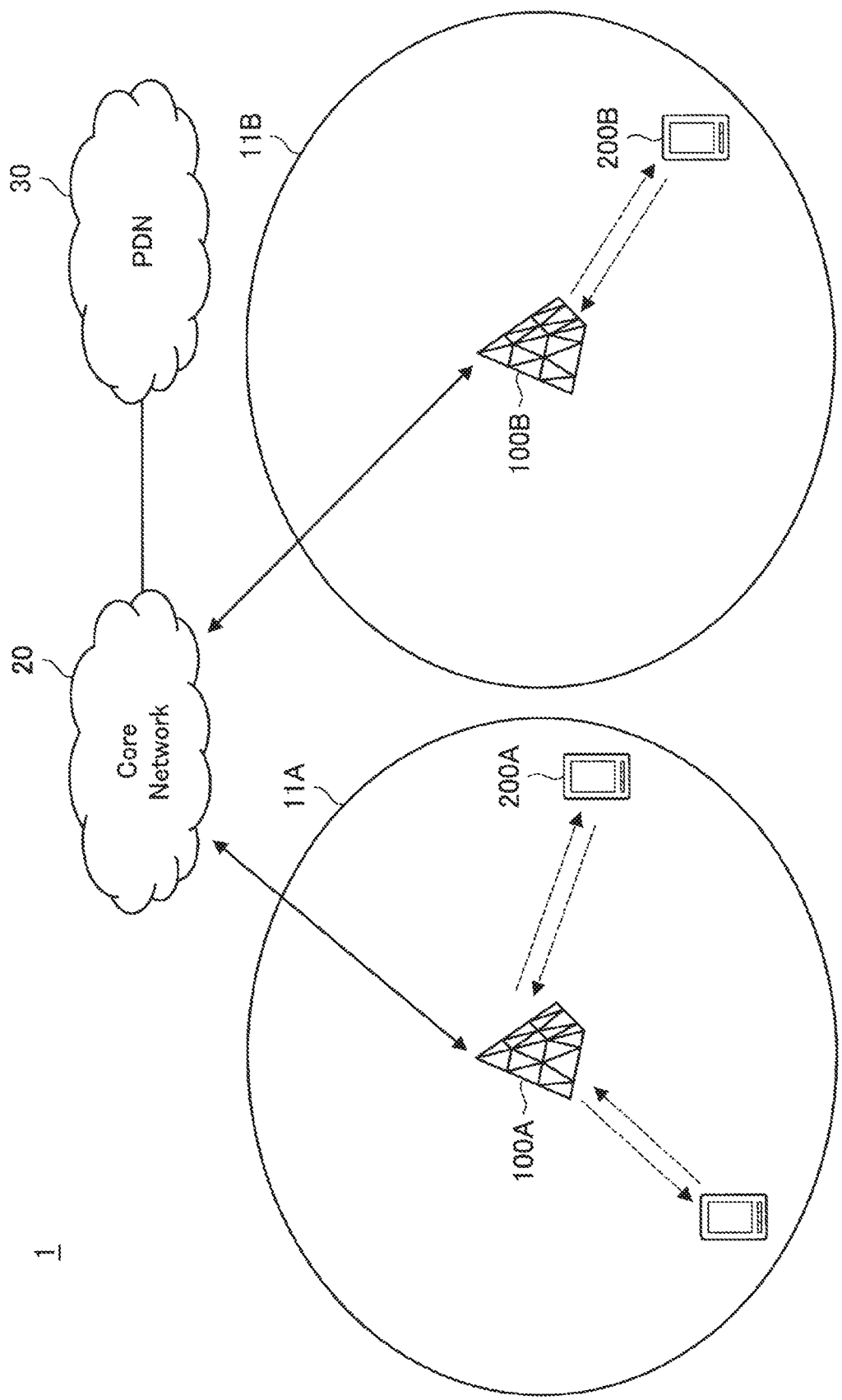
FIG. 1 is a diagram illustrating an example of an overall configuration of a system according to an embodiment of the present disclosure.

Hereinafter, preferred embodiments of the present disclosure will be described in detail with reference to the accompanying drawings. Note that, in the present specification and the drawings, components having substantially the same functional configuration are denoted by the same reference numerals, and an overlapping description will be omitted.

Note that the description will be made in the following order.
1. Introduction
2. Example of Configuration
3. Technical Features
4. Application Examples
5. Summary

1. Introduction

1.1. Example of Configuration of System

FIG. 1 is a diagram illustrating an example of an overall configuration of a system 1 according to an embodiment of the present disclosure. As illustrated in FIG. 1, the system 1 includes a base station device 100 (100A and 100B), a terminal device 200 (200A and 200B), a core network 20, and a packet data network (PDN) 30.

The base station device 100 operates a cell 11 (11A or 11B) and provides a radio service to one or more terminal devices located inside the cell 11. For example, the base station device 100A provides a radio service to the terminal device 200A, and the base station device 100B provides a radio service to the terminal device 200B. The cell 11 can be operated according to any radio communication scheme such as LTE or New Radio (NR). The base station device 100 is connected to the core network 20. The core network 20 is connected to the PDN 30.

The core network 20 can include a mobility management entity (MME), a serving gateway (S-GW), a PDN gateway (P-GW), a policy and charging rule function (PCRF), and a home subscriber server (HSS). Alternatively, the core network 20 can include entities of the NR having functions similar to those described above. The MME is a control node that handles a control plane signal, and manages a movement state of the terminal device. The S-GW is a control node that handles a user plane signal, and is a gateway device that switches a user data transfer path. The P-GW is a control node that handles a user plane signal, and is a gateway device serving as a connection point between the core network 20 and the PDN 30. The PCRF is a control node that performs a control related to a policy such as Quality of Service (QoS) for a bearer and charging. The HSS is a control node that handles subscriber data and performs a service control.

The terminal device 200 performs radio communication with the base station device 100 based on a control of the base station device 100. The terminal device 200 may be a so-called user equipment (UE). For example, the terminal device 200 transmits an uplink signal to the base station device 100 and receives a downlink signal from the base station device 100.

Particularly, in the present embodiment, the base station devices 100A and 100B are operated by different operators, respectively. For example, the base station device 100A is operated by an operator A, and the base station device 100B is operated by an operator B. Further, the base station devices 100A and 100B provide a radio communication service while sharing a radio resource that is sharable between the operators operating the base station devices, respectively.

1.2. Technical Problem

As described above, in a case where a plurality of base station devices operated by different operators, respectively, are independently operated and share a frequency, it can be difficult to appropriately share a frequency in the LBT framework described above.

Specifically, in a case where a plurality of base station devices operated by different operators, respectively, are independently operated and share a frequency, the use of the radio resource is not guaranteed until the LBT is completed. Therefore, in an environment where a channel (that is, a radio resource) is congested, it takes time to complete the LBT and occupy the channel. Therefore, there is a possibility that the Quality of Service (QoS) is not satisfied, and in particular, a delay requirement is not satisfied.

A countermeasure for satisfying the QoS (particularly, the delay requirement) includes a method of transmitting dummy information in advance to occupy a channel. In a case where such a countermeasure is adopted, a channel is occupied in advance, and thus a transmission opportunity is secured and the QoS is satisfied. However, transmitting dummy information should be avoided because a decrease in frequency use efficiency is caused.

1.3. Overview of Proposed Method

In view of the above technical problem, the present disclosure suggests a mechanism in which a plurality of base station devices 100 operated by different operators, respectively, can share a frequency resource while cooperating with each other.

In the present embodiment, a guaranteed resource is configured for the base station device 100. The guaranteed resource is a radio resource (time resource and frequency resource) that can be preferentially used by the base station device 100 among radio resources that can be shared between different operators. Further, a plurality of base station devices 100 operated by different operators, respectively, share configuration information related to the guaranteed resource. Each base station device 100 imposes a restriction on its own use of a guaranteed resource configured for another base station device 100 operated by another operator, based on the shared configuration information. That is, the guaranteed resource configured for a base station device 100 of a certain operator is less likely to be used by a base station device 100 of another operator. Such coordination increases a channel access right acquisition rate of a base station device 100 with respect to a guaranteed resource configured for the base station device 100.

1.4. Related Technologies

Hereinafter, a technology related to the proposed method will be described.

Frame Configuration of NR in Present Embodiment

Figure 2:
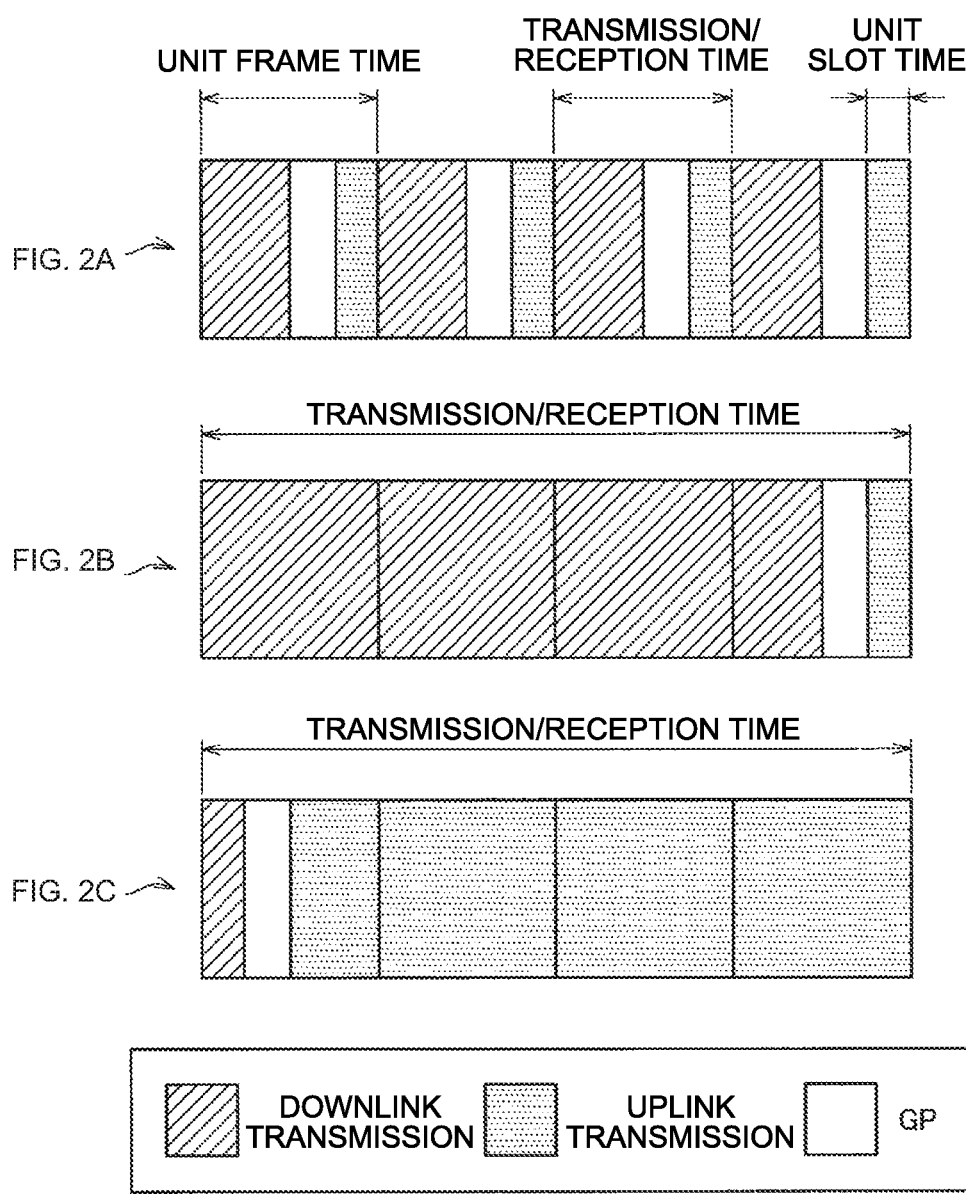
FIGS. 2A, 2B, and 2C are diagrams illustrating examples of a frame configuration of self-contained transmission in the present embodiment.

In the NR, a physical channel and/or a physical signal may be transmitted by self-contained transmission. FIGS. 2A, 2B, and 2C illustrate a frame configuration of the self-contained transmission in the present embodiment. In the self-contained transmission, one transmission/reception sequentially includes continuous downlink transmission, a guard period (GP), and continuous downlink transmission. The continuous downlink transmission includes at least one downlink control information and a demodulation reference signal (DMRS). The downlink control information instructs reception of a downlink physical channel included in the continuous downlink transmission or transmission of an uplink physical channel included in the continuous uplink transmission. In a case where the downlink control information instructs reception of the downlink physical channel, the terminal device 200 attempts to receive the downlink physical channel based on the downlink control information. Then, the terminal device 200 transmits information on success or failure (success or failure of decoding) of the reception of the downlink physical channel, using the uplink control channel included in the uplink transmission allocated after the GP. On the other hand, in a case where the downlink control information instructs transmission of the uplink physical channel, the transmission is performed by including the uplink physical channel transmitted based on the downlink control information in the uplink transmission. As described above, it is possible to immediately respond to an increase or decrease in a traffic ratio between the uplink and the downlink by flexibly switching between transmission of uplink data and transmission of downlink data based on the downlink control information. Further, it is possible to implement low-delay communication in the downlink by notifying the success or failure of the reception in the downlink through the immediately following uplink transmission.

A unit slot time is a minimum time unit that defines downlink transmission, a GP, or uplink transmission. The unit slot time is reserved for any of the downlink transmission, the GP, or the uplink transmission. The unit slot time does not include both downlink transmission and uplink transmission. The unit slot time may be a minimum transmission time of a channel associated with a DMRS included in the unit slot time. One unit slot time is defined as, for example, an integer multiple of a sampling interval ($T_s$) or symbol length of the NR.

A unit frame time may be a minimum time specified by scheduling. The unit frame time may be a minimum unit at which a transport block is transmitted. The unit slot time may be a maximum transmission time of a channel associated with a DMRS included in the unit slot time. The unit frame time may be a unit time used to determine uplink transmission power in the terminal device 200. The unit frame time may be referred to as a subframe. There are three types of unit frame time: downlink transmission only, uplink transmission only, and a combination of uplink transmission and downlink transmission. One unit frame time is defined as, for example, an integer multiple of a sampling interval ($T_s$) or symbol length of the NR, or a unit slot time.

A transmission/reception time is a time for one transmission/reception. A time between one transmission/reception and another transmission/reception is occupied by a time (gap) during which no physical channel or physical signal is transmitted. The terminal device 200 does not have to average a channel state information (CSI) measurement between different transmissions/receptions. The transmission/reception time may also be referred to as TTI. One transmission/reception time is defined as, for example, an integer multiple of a sampling interval ($T_s$) or symbol length of the NR, a unit slot time, or a unit frame time.

Channel Access Procedure for Unlicensed Channel

A channel access (Listen before Talk) procedure is performed to access an unlicensed channel on which the base station device or the terminal device performs transmission.

In the channel access procedure, one or more times of channel sensing are performed. Determination (occupation determination) of whether the channel is idle (unoccupied, available, or enabled) or busy (occupied, unavailable, or disabled) based on a sensing result. In the channel sensing, power of the channel during a predetermined waiting time is sensed.

Examples of the waiting time of the channel access procedure include a first waiting time (slot), a second waiting time, a third waiting time (defer period), and a fourth waiting time.

A slot is a unit of waiting time of a base station device and a terminal device in the channel access procedure. The slot is defined as, for example, 9 microseconds.

In the second waiting time, one slot is inserted at the head. The second waiting time is defined as, for example, 16 microseconds.

The defer period includes the second waiting time and a plurality of consecutive slots following the second waiting time. The number of the plurality of consecutive slots following the second waiting time is determined based on a priority class (channel access priority class) used to satisfy the QoS.

The fourth waiting time includes the second waiting time and one slot following the second waiting time.

The base station device or the terminal device senses a predetermined channel during a predetermined slot. In a case where power detected by the base station device or the terminal device for at least 4 microseconds within the predetermined slot is smaller than a predetermined power detection threshold, the predetermined slot is considered to be idle. On the other hand, in a case where the power is greater than the predetermined power detection threshold, the predetermined slot is considered to be busy.

The channel access procedure includes a first channel access procedure and a second channel access procedure. The first channel access procedure is performed using a plurality of slots and a defer period. The second channel access procedure is performed using one fourth waiting time.

Parameters related to channel access are determined based on the priority class. Examples of the parameters related to channel access include a minimum contention window, a maximum contention window, a maximum channel occupation time, and a possible contention window value. The priority class is determined by a value of a QoS class identifier (QCI) for processing the Quality of Service (QoS). Table 1 is a table showing correspondence between priority classes and parameters related to channel access, and Table 2 shows an example of mapping between priority classes and QCIs.

TABLE 1

Example of Table Showing Correspondence between Priority Classes and Parameters Related to Channel Access

| Channel Access Priority Class (P) | $m_p$ | Minimum Contention Window $CW_{min,p}$ | Maximum Contention Window $CW_{max,p}$ | Maximum Channel Occupation Time $T_{mcot,p}$ | Possible Contention Window Value $CW_p$ |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

TABLE 2

Example of Mapping Between Priority Classes and QCIs

| Channel Access Priority Class | QCI |
|---|---|
| 1 | 1, 3, 5, 65, 66, 69 |
| 2 | 2, 7 |
| 3 | 4, 6, 8, 9 |
| 4 | Others |

Details of First Channel Access Procedure

In the first channel access procedure, the following procedure is performed.

(0) The channel sensing is performed during a defer period. In a case where the channel is idle in a slot within a defer period, the procedure proceeds to Step (1); otherwise, the procedure proceeds to Step (6).

(1) An initial value of a counter is acquired. A possible initial value of the counter is an integer between 0 and a contention window CW. The initial value of the counter is determined randomly according to uniform distribution. The initial value of the counter is set in a counter N, and the procedure proceeds to Step (2).

(2) In a case where the counter N is larger than 0 and subtraction of the counter N is selected, 1 is subtracted from the counter N. Thereafter, the procedure proceeds to Step (3).

(3) A slot is added and waiting is performed. Further, in the added slot, a channel is sensed. In a case where the added slot is idle, the procedure proceeds to Step (4); otherwise, the procedure proceeds to Step (5).

(4) In a case where the counter N is 0, the procedure is stopped. Otherwise, the procedure proceeds to Step (2).

(5) A defer period is added and waiting is performed. Further, a channel is sensed until the channel is detected as being busy in one of slots included in the added defer period, or until all the slots included in the added defer period can be detected as being idle. Thereafter, the procedure proceeds to Step (6).

(6) In a case where the channel is sensed as idle in all of the slots included in the added defer period, the procedure proceeds to Step (4); otherwise, the procedure proceeds to Step (5).

After the stop in Step (4) in the above-described procedure, transmission including data such as a physical downlink shared channel (PDSCH) and a physical uplink shared channel (PUSCH) is performed on the channel.

Note that, after the stop in Step (4) in the above-described procedure, transmission need not be performed on the channel. In this case, thereafter, transmission may be performed without performing the above-described procedure in a case where the channel is idle in all the slots and the defer period immediately before the transmission. On the other hand, in a case where the channel is not idle in any of the slots and the defer period, the procedure proceeds to Step (1) after the channel is sensed as idle in all of the slots in the added defer period.

Details of Second Channel Access Procedure

In the second channel access procedure, the transmission may occur immediately after the channel is determined as being idle as a result of sensing for at least the fourth waiting time. On the other hand, in a case where it is determined that the channel is not idle as a result of sensing for at least the fourth waiting time, no transmission is performed.

Contention Window Adaptation Procedure

The contention window (CW) used in the first channel access procedure is determined based on a contention window adaptation procedure.

A value of the contention window CW is retained for each priority class. Further, the contention window CW has a value between the minimum contention window and the maximum contention window. The minimum contention window and the maximum contention window are determined based on the priority class.

Adjustment of the value of the contention window CW is performed before Step (1) in the first channel access procedure. The value of the contention window CW is increased in a case where a proportion of NACK in hybrid automatic repeat request (HARQ) responses corresponding to a shared channel of a reference subframe or a reference HARQ process in the contention window adaptation procedure is higher than a threshold. Otherwise, the value of the contention window CW is set to the minimum contention window.

The value of the contention window CW is increased based on, for example, Equation CW=2·(CW+1)−1.

Details of Channel Access Procedure in Downlink

In a case of performing downlink transmission including a PDSCH, a physical downlink control channel (PDCCH), and/or an enhanced physical downlink control channel (EPDCCH) on the unlicensed channel, the base station device accesses the channel based on the first channel access procedure and performs the downlink transmission.

On the other hand, in a case of performing downlink transmission that includes a DRS, but does not include the PDSCH on the unlicensed channel, the base station device accesses the channel based on the second channel access procedure and performs the downlink transmission. Note that the period of the downlink transmission is preferably shorter than 1 millisecond.

Details of Channel Access Procedure in Uplink

On the unlicensed channel, in a case where it is indicated to perform the first channel access procedure by an uplink grant for scheduling a PUSCH, the terminal device performs the first channel access procedure before the uplink transmission including the PUSCH.

Further, in a case where it is instructed to perform the second channel access procedure by an uplink grant for scheduling a PUSCH, the terminal device performs the second channel access procedure before the uplink transmission including the PUSCH.

Further, for uplink transmission that does not include the PUSCH, but includes a sounding reference signal (SRS), the terminal device performs the second channel access procedure before the uplink transmission.

Further, in a case where the end of the uplink transmission indicated by the uplink grant is within an uplink duration (UL duration), regardless of a procedure type indicated by the uplink grant, the terminal device performs the second channel access procedure before the uplink transmission.

Further, in a case where uplink transmission is performed after the fourth waiting time after the end of downlink transmission from a base station, the terminal device performs the second channel access procedure before the uplink transmission.

Channel Access Procedure of NR in Present Embodiment

In a channel access procedure on an unlicensed channel using the NR, non-beamformed channel sensing and beamformed channel sensing are performed.

The non-beamformed channel sensing is channel sensing by reception of which directivity is not controlled, or channel sensing without direction information. The channel sensing without direction information is, for example, channel sensing in which measurement results are averaged in all directions. A transmitting station does not need to recognize the directivity (angle and direction) used in the channel sensing.

The beamformed channel sensing is channel sensing by reception of which directivity is controlled, or channel sensing with direction information. That is, the beamformed channel sensing is channel sensing in which a reception beam is directed in a predetermined direction. A transmitting station having a function of performing the beamformed channel sensing can perform one or more times of channel sensing with different directivities.

An area detected by sensing is reduced by performing the beamformed channel sensing. As a result, the transmitting station can reduce the frequency of detection of a communication link that does not cause interference, and can reduce the problem of exposed terminals.

2. Example of Configuration 2.1 Example of Configuration of Base Station Device

Figure 3:
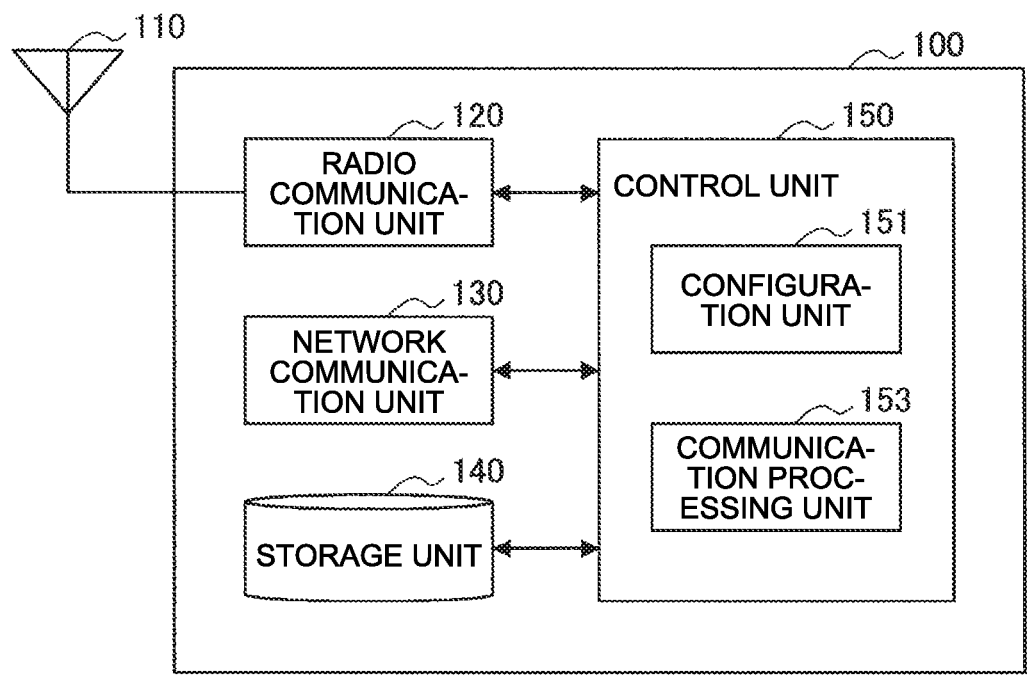
FIG. 3 is a block diagram illustrating an example of a configuration of a base station device according to the present embodiment.

FIG. 3 is a block diagram illustrating an example of a configuration of the base station device 100 according to the present embodiment. Referring to FIG. 3, the base station device 100 includes an antenna unit 110, a radio communication unit 120, a network communication unit 130, a storage unit 140, and a control unit 150.

(1) Antenna Unit 110

The antenna unit 110 radiates a signal output from the radio communication unit 120 into a space, as a radio wave. Further, the antenna unit 110 converts a radio wave in the space into a signal and outputs the signal to the radio communication unit 120.

(2) Radio Communication Unit 120

The radio communication unit 120 transmits and receives a signal. For example, the radio communication unit 120 transmits a downlink signal to the terminal device and receives an uplink signal from the terminal device.

(3) Network Communication Unit 130

The network communication unit 130 transmits and receives information. For example, the network communication unit 130 transmits information to another node and receives information from another node. For example, other nodes include other base stations and core network nodes.

(4) Storage Unit 140

The storage unit 140 temporarily or permanently stores a program and various data for the operation of the base station device 100.

(5) Control Unit 150

The control unit 150 controls the overall operation of the base station device 100 to provide various functions of the base station device 100. The control unit 150 includes a configuration unit 151 and a communication processing unit 153.

The configuration unit 151 has a function of performing configuration related to communication with the terminal device 200. For example, the configuration unit 151 configures a guaranteed resource that can be used preferentially by the base station device 100 itself. Further, the configuration unit 151 performs negotiation for configuration of a guaranteed resource, with another base station device 100 operated by an operator different from an operator operating the base station device 100. Similarly, the configuration unit 151 performs negotiation for configuration of a guaranteed resource that can be used preferentially by the other base station device 100, with the other base station device 100.

The communication processing unit 153 has a function of performing processing for communication with the terminal device 200. For example, the communication processing unit 153 performs communication with the terminal device 200 by preferentially using the guaranteed resource configured by the configuration unit 151. Further, the communication processing unit 153 restricts its own use of a guaranteed resource configured for another base station device 100 to enable another base station device 100 to preferentially use the guaranteed resource.

The control unit 150 can further include other components other than these components. That is, the control unit 150 can also perform operations other than the operations of these components.

2.2. Example of Configuration of Terminal Device

Figure 4:
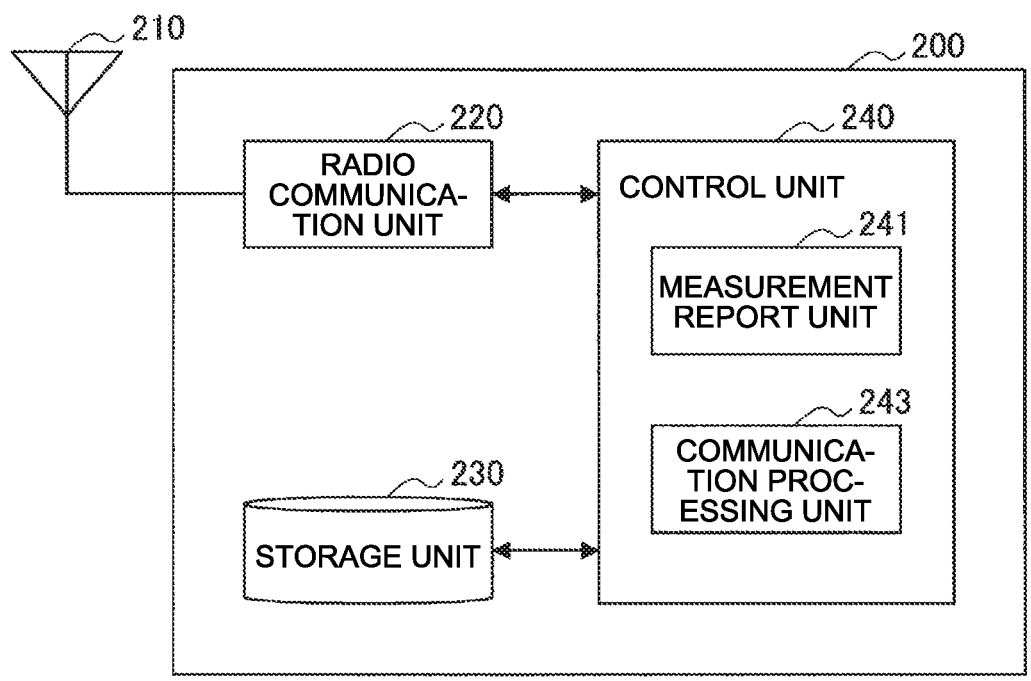
FIG. 4 is a block diagram illustrating an example of a configuration of a terminal device according to the present embodiment.

FIG. 4 is a block diagram illustrating an example of a configuration of the terminal device 200 according to the present embodiment. Referring to FIG. 4, the terminal device 200 includes an antenna unit 210, a radio communication unit 220, a storage unit 230, and a control unit 240.

(1) Antenna Unit 210

The antenna unit 210 radiates a signal output from the radio communication unit 220 into a space, as a radio wave. Further, the antenna unit 210 converts a radio wave in the space into a signal and outputs the signal to the radio communication unit 220.

(2) Radio Communication Unit 220

The radio communication unit 220 transmits and receives a signal. For example, the radio communication unit 220 receives a downlink signal from a base station and transmits an uplink signal to the base station.

(3) Storage Unit 230

The storage unit 230 temporarily or permanently stores a program and various data for the operation of the terminal device 200.

(4) Control Unit 240

The control unit 240 controls the overall operation of the terminal device 200 and provides various functions of the terminal device 200. The control unit 240 includes a measurement report unit 241 and a communication processing unit 243.

The measurement report unit 241 has a function of performing measurement report processing. The measurement report unit 241 measures a measurement signal (for example, a measurement signal such as a discovery signal (DS) or a channel state information reference signal (CSI-RS)) transmitted from the base station device 100. In the present embodiment, the measurement report unit 241 performs measurement not only on a measurement signal transmitted from the base station device 100 to which the terminal device 200 is connected, but also on a measurement signal transmitted from another base station device 100 operated by an operator different from the operator operating the base station device 100. The measurement performed by the measurement report unit 241 includes radio resource management (RRM) (measurement of reference signal received power (RSRP), reference signal received quality (RSRQ), received signal strength indicator (RSSI), or the like) or CSI measurement. The measurement report unit 241 transmits a measurement report including information indicating a measurement result to the base station device 100.

The communication processing unit 243 has a function of performing processing for communication with the base station device 100. For example, the communication processing unit 243 performs communication with the base station device 100 using the guaranteed resource configured by the base station device 100.

The control unit 240 can further include other components other than these components. That is, the control unit 240 can perform operations other than the operations of these components.

3. Technical Features

Hereinafter, a base station device 100 for which the guaranteed resource is configured is referred to as a first base station device 100. Further, a base station device 100 that performs processing for enabling the first base station device 100 to preferentially use the guaranteed resource configured for the first base station device 100 is also referred to as a second base station device 100. The second base station device 100 is operated by an operator different from the operator operating the first base station device 100. The operator operating the first base station device 100 is also referred to as a first operator, and the operator operating the second base station device 100 is also referred to as a second operator.

The base station device 100 can function as both the first base station device 100 and the second base station device 100. In a case where the base station device 100 functions as the first base station device 100, the guaranteed resource corresponds to a first guaranteed resource which is a guaranteed resource configured for the first base station device 100, and the configuration information corresponds to first configuration information. In a case where the base station device 100 functions as the second base station device 100, the guaranteed resource corresponds to a second guaranteed resource which is a guaranteed resource configured for another base station device 100 operated by another operator, and the configuration information corresponds to second configuration information.

Hereinafter, the technical features of the present embodiment will be described in detail.

(1) Sharing of Configuration Information of Guaranteed Resource

The first base station device 100 (for example, the configuration unit 151) transmits, to the second base station device 100, configuration information of a guaranteed resource that can be used preferentially by the first base station device 100 among radio resources that can be shared between the first operator and the second operator. The number of second base station devices 100 to which the configuration information is transmitted may be one or plural. In addition, the number of second operators may be one or plural. As the configuration information is transmitted to the second base station device 100, the second base station device 100 performs processing for enabling the first base station device 100 to preferentially use the guaranteed resource. As a result, the first base station device 100 can preferentially use the guaranteed resource. The configuration information of the guaranteed resource can also be considered as information requesting permission for the preferential use of the guaranteed resource by the first base station device 100. Note that the guaranteed resource may be used for transmission and reception of an uplink signal or may be used for transmission and reception of a downlink signal.

The second base station device 100 (for example, the configuration unit 151) receives, from the first base station device 100, the configuration information of the guaranteed resource that can be used preferentially by the first base station device 100 among the radio resources that can be shared between the first operator and the second operator. Then, the second base station device 100 (for example, the communication processing unit 153) performs processing for enabling the first base station device 100 to preferentially use the guaranteed resource based on the received configuration information. Specifically, the second base station device 100 restricts its own use of a guaranteed resource that can be preferentially used by the first base station device 100. The second base station device 100 can enable the first base station device 100 to preferentially use the guaranteed resource by restricting its own use of the guaranteed resource based on the received configuration information.

The first base station device 100 and the second base station device 100 sharing the configuration information have a relationship in which coverages overlap or are adjacent. In other words, the configuration of the guaranteed resource of the first base station device 100 is effective within a range of the coverage of the first base station device 100. Therefore, the first base station device 100 can preferentially use the guaranteed resource of the first base station device 100 as compared with the second base station device 100 of which the coverage overlaps or is adjacent to that of the first base station device 100.

(2) Operation for Guaranteed Resource

Restriction on the Use of the Guaranteed Resource by the Second Base Station Device 100

Hereinafter, the restriction on the use of the guaranteed resource by the second base station device 100 (for example, the communication processing unit 153) will be described in detail.

Figure 5:
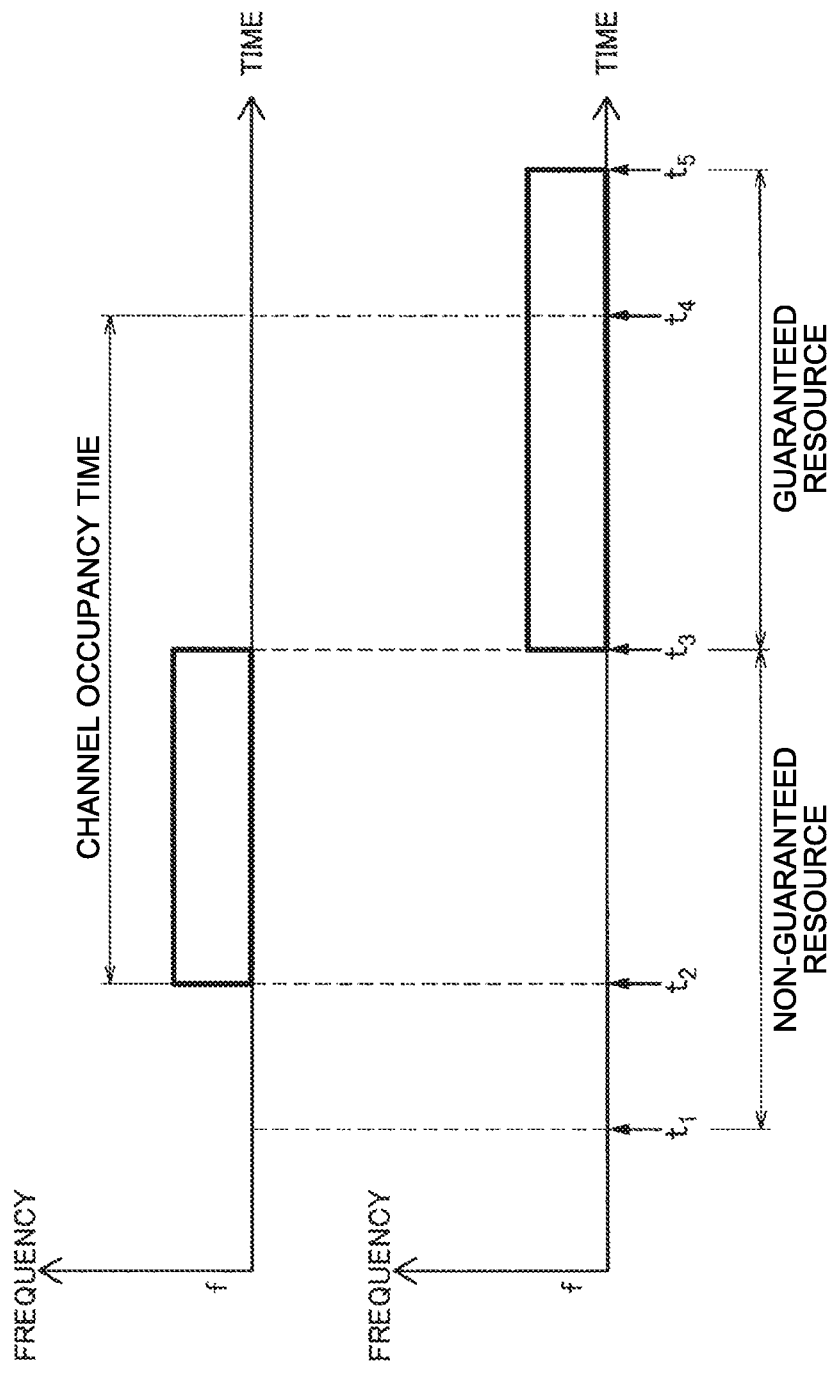
FIG. 5 is a diagram for describing release of a guaranteed resource according to the present embodiment.

The second base station device 100 releases the guaranteed resource. Specifically, in a case where a currently used radio resource and the guaranteed resource overlap each other, the second base station device 100 stops using the radio resource in the overlapping portion. This will be described with reference to FIG. 5. FIG. 5 is a diagram for describing release of a guaranteed resource according to the present embodiment. The upper part of FIG. 5 illustrates the release of the guaranteed resource by the second base station device 100. The lower part of FIG. 5 illustrates the use of the guaranteed resource by the first base station device 100. It is assumed that a radio resource of a frequency f and times $t_1$ to $t_3$ is a non-guaranteed resource, and a radio resource of the frequency f and times $t_3$ to $t_5$ is a guaranteed resource that can be preferentially used by the first base station device 100. In addition, it is assumed that a time from the time $t_2$ to the time $t_4$ is a channel occupancy time of the frequency f of the second base station device 100. The channel occupancy time is a period during which the right to access the channel (that is, the frequency f) occupied through channel access based on the LBT is valid. As illustrated in the upper part of FIG. 5, the second base station device 100 transmits a signal using the frequency f for which the access right is secured, because the times $t_2$ to $t_3$ correspond to the non-guaranteed resource and are within the channel occupancy time. On the other hand, since a time after the time $t_3$ corresponds to the guaranteed resource, the second base station device 100 stops using the frequency f at the time $t_3$. That is, at the time $t_3$, the second base station device 100 stops transmitting the signal using the frequency f and releases the frequency f.

The second base station device 100 does not have to use the guaranteed resource. In the example illustrated in the upper part of FIG. 5, the second base station device 100 releases the frequency f without transmitting a signal using the frequency f from the time $t_3$ to the time $t_5$. As a result, it is possible to reliably guarantee the preferential use of the guaranteed resource by the first base station device 100.

The second base station device 100 may use the guaranteed resource after performing carrier sensing. In the example illustrated in the upper part of FIG. 5, the second base station device 100 temporarily stops using the frequency f and releases the frequency f at the time $t_3$. Thereafter, the second base station device 100 performs carrier sensing for the frequency f again, and uses the frequency f after securing the access right. In other words, the second base station device 100 uses the guaranteed resource when the first base station device 100 does not use the guaranteed resource. As a result, it is possible to prevent a decrease in frequency use efficiency when the first base station device 100 does not use the guaranteed resource while ensuring the preferential use of the guaranteed resource by the first base station device 100.

The Use of the Guaranteed Resource by the First Base Station Device 100

The first base station device 100 (for example, the communication processing unit 153) preferentially uses the guaranteed resource.

The preferential use of the guaranteed resource means, for example, not imposing the above-described restriction on the use. That is, the first base station device 100 may continue to use the radio resource in the overlapping portion even in a case where the currently used radio resource and the guaranteed resource overlap each other. Further, the first base station device 100 may use the guaranteed resource without performing the carrier sensing. The use of the guaranteed resource by first base station device 100 will be described with reference to FIG. 5 again. As illustrated in the lower part of FIG. 5, the times $t_3$ to $t_5$ correspond to the guaranteed resource. Therefore, the first base station device 100 starts using the guaranteed resource from the time $t_3$. In the example illustrated in the lower part of FIG. 5, the first base station device 100 releases the radio resource at the time $t_5$ at which the guaranteed resource ends. The first base station device 100 may continuously use the same frequency even after the end of the guaranteed resource.

The first base station device 100 transmits, for example, a signal/information having a high priority using the guaranteed resource. Examples of the signal/information having a high priority include a synchronization signal, a random access channel, paging, system information, reference signals and control information (ACK/NACK, or the like), and data requiring low delay.

(3) Configuration of Guaranteed Resource

Figure 6:
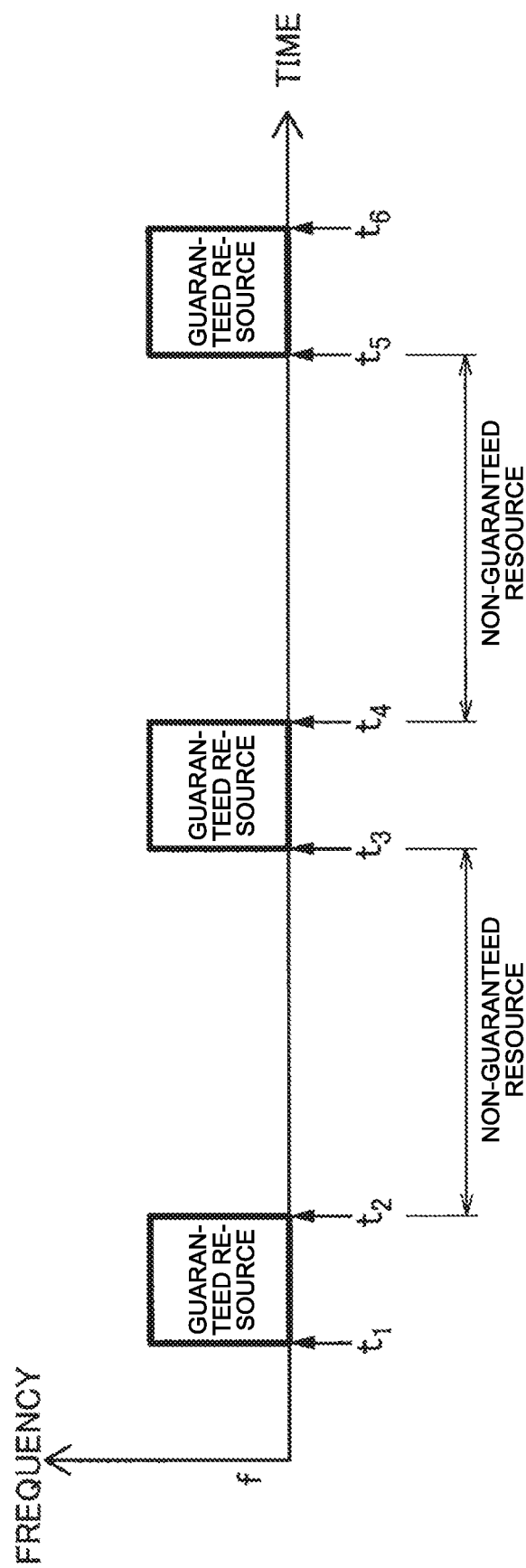
FIG. 6 is a diagram for describing configuration of a guaranteed resource according to the present embodiment.

The first base station device 100 (for example, the configuration unit 151) may configure a guaranteed resource by itself and generate configuration information. By doing so, the first base station device 100 can adaptively configure a guaranteed resource according to interference between operators, a priority of data to be transmitted and received, and the like. The configuration of a guaranteed resource will be described with reference to FIG. 6. FIG. 6 is a diagram for describing configuration of a guaranteed resource according to the present embodiment. As illustrated in FIG. 6, the first base station device 100 configures a radio resource of a frequency f and times $t_1$ to $t_2$, a radio resource of the frequency f and times $t_3$ to $t_4$, and a radio resource of the frequency f and times $t_5$ to $t_6$ as guaranteed resources. The first base station device 100 can preferentially use these radio resources configured as guaranteed resources. On the other hand, a radio resource of the frequency f and the times $t_2$ to $t_3$ and a radio resource of the frequency f and the times $t_4$ to $t_5$ are non-guaranteed resources. Note that the non-guaranteed resources are radio resources that are not configured as guaranteed resources. The first base station device 100 and the second base station device 100 use these non-guaranteed resources by performing channel access based on the LBT.

The first base station device 100 may configure a guaranteed resource so as to satisfy a predetermined condition. Examples of the predetermined condition include a proportion of the guaranteed resource in the entire radio resources being less than a predetermined threshold. As a result, a monopoly of a specific operator on a radio resource is prevented. The predetermined threshold is set to, for example, 10%. The predetermined threshold may be determined according to the total number of operators operating the first base station device 100 and the second base station device 100. In this case, the predetermined threshold is set to, for example, 10/(total number of operators) %.

Note that the configuration of the guaranteed resource and the generation of the configuration information may be performed by a control entity of an operator. Such a control entity is included in, for example, the core network 20.

The guaranteed resource may be configured for the terminal device 200 for uplink transmission of a physical random access channel (PRACH), an SRS, a physical uplink control channel (PUCCH), a PUSCH, or the like. The guaranteed resource is configured by system information (master information block (MIB) or system information block (SIB)) or radio resource control (RRC) signaling. The terminal device 200 can preferentially transmit an uplink channel/signal on the guaranteed resource.

Examples of the physical channel or physical signal transmitted from the terminal device 200 using the guaranteed resource include a PRACH, an SRS for beam management, a PUCCH including HARQ-ACK, or a semi-persistent scheduling (SPS) or grant-free PUSCH (a PUSCH which is not scheduled by downlink control information (DCI)).

Examples of configuration of a time resource of the guaranteed resource include a cycle and an offset.

Examples of the configuration of the time resource of the guaranteed resource include a set of slots represented by a bitmap. Each bit of the bitmap corresponds to a slot (alternatively, a slot group or a subframe). 0/1 of the bit represents guaranteed resource/non-guaranteed resource.

Examples of configuration of a frequency resource of the guaranteed resource include a set of resource blocks represented by a bitmap. Each bit of the bitmap corresponds to a resource block (alternatively, a resource block group). 0/1 of the bit represents guaranteed resource/non-guaranteed resource.

Examples of the configuration of the guaranteed resource include specification of a physical channel and a physical signal permitted to be transmitted on the configured guaranteed resource. For example, it is specified that transmission of a PUCCH including HARQ is permitted on a guaranteed resource, but transmission of a PUCCH not including HARQ is not permitted. Thereby, it is possible to perform a flexible control according to the communication environment.

It is preferable that the guaranteed resource is configured for a primary cell (PCell) or a primary secondary cell (PSCell) in which a signal/information having a high priority is transmitted. In other words, it is preferable that the guaranteed resource is not configured for a secondary cell.

Further, a band in which the guaranteed resource can be configured may be limited so that the guaranteed resource is configured in the same band commonly for the operators.

Further, the terminal device 200 may acquire shared information of different operators. The terminal device 200 may acquire the shared information of different operators via the connected base station device 100, or by using a physical channel and/or a physical signal for sharing between the operators transmitted from the base station devices 100 of the different operators. By doing so, the terminal device 200 can perform communication while avoiding guaranteed resources of different operators.

(4) Negotiation for Configuration of Guaranteed Resource

Negotiation for configuration of a guaranteed resource may be performed between operators. For example, the first base station device 100 (for example, the configuration unit 151) and the second base station device 100 (for example, the configuration unit 151) may perform negotiation for configuration of a guaranteed resource. Alternatively, negotiation may be performed between control entities of respective operators.

Negotiation Before the Configuration of the Guaranteed Resource

For example, the second base station device 100 may transmit, to the first base station device 100, information indicating a radio resource that is requested not to be configured as the guaranteed resource. The radio resource that is requested not to be configured as the guaranteed resource is a radio resource that is not preferable to be configured as the guaranteed resource, for the second base station device 100. Examples of such a radio resource include a radio resource for a signal/information having a high priority. Examples of the signal/information having a high priority include a synchronization signal, a random access channel, paging, system information, a reference signal, control information (ACK/NACK, or the like), and data requiring low delay.

For example, the second base station device 100 may transmit, to the first base station device 100, information indicating a radio resource that is permitted to be configured as the guaranteed resource. The radio resource that is permitted to be configured as the guaranteed resource is a radio resource that may be configured as the guaranteed resource, for the second base station device 100. Such a radio resource can be a radio resource other than the radio resource that is not required to be configured as the guaranteed resource described above.

As such negotiation is performed before the configuration of the guaranteed resource, negotiation after the configuration, which will be described later, becomes unnecessary, such that the guaranteed resource can be configured efficiently.

Negotiation after the Configuration of the Guaranteed Resource

The second base station device 100 may transmit, to the first base station device 100, a response indicating whether or not to accept the preferential use of the guaranteed resource configured for the first base station device 100 by the first base station device 100. In other words, the second base station device 100 may determine whether or not to accept or reject the restriction imposed on its own use of the guaranteed resource, and transmit a determination result to the first base station device 100. The second base station device 100 makes such a determination based on guaranteed resource configuration information received from the first base station device 100. In a case where the second base station device 100 accepts the restriction on the use, the use of the guaranteed resource is restricted. On the other hand, in a case where the second base station device 100 rejects the restriction on the use, the use of the guaranteed resource is not restricted.

The second base station device 100 may transmit, to the first base station device 100, information requesting a change of the guaranteed resource. The request for the change of the guaranteed resource may be a request for moving the guaranteed resource to another radio resource, a request for canceling the configuration of the guaranteed resource, or a request for releasing the guaranteed resource. The second base station device 100 can request the change of the guaranteed resource in a case where the radio resource that is not preferable to be configured as the guaranteed resource is configured as the guaranteed resource. The first base station device 100 changes, cancels, or releases the guaranteed resource based on the request.

The first base station device 100 controls transmission and reception of a signal on a guaranteed resource based on a response indicating whether or not to accept the preferential use of the guaranteed resource by the first base station device 100, the response being received from the second base station device 100. In other words, the first base station device 100 controls transmission and reception of a signal on a guaranteed resource based on a response indicating whether or not to accept the restriction on the use of the guaranteed resource, the response being received from the second base station device 100. For example, the first base station device 100 preferentially uses the guaranteed resource in a case where a response indicating acceptance of the restriction on the use of the guaranteed resource is received. On the other hand, the first base station device 100 does not preferentially use the guaranteed resource in a case where a response indicating rejection of the restriction on the use of the guaranteed resource is received. In a case where there are a plurality of second base station devices 100, the first base station device 100 does not preferentially use the guaranteed resource in a case where a response indicating rejection of the restriction on the use of the guaranteed resource is received from one or more second base station devices 100. Thereby, interference between operators can be prevented. The response indicating the rejection may include information indicating the reason for the rejection. For example, examples of the information included in the response indicating the rejection include information on rejection due to an excessive guaranteed resource request, and rejection information indicating that a requested guaranteed resource overlaps with another guaranteed resource.

As such negotiation is performed after the configuration of the guaranteed resource, a plurality of operators sharing a radio resource can prevent a radio resource that is not to be configured as the guaranteed resource from being configured as the guaranteed resource by another operator.

Note that it is desirable that at least one of the negotiation before the configuration of the guaranteed resource or the negotiation after the configuration of the guaranteed resource is performed. It is a matter of course that both of the negotiation before the configuration of the guaranteed resource and the negotiation after the configuration of the guaranteed resource may be performed.

(5) Information Shared Between Operators

The first base station device 100 (for example, the configuration unit 151) and the second base station device 100 (for example, the configuration unit 151) share (that is, transmit and receive) various information. Hereinafter, the information shared between the first base station device 100 and the second base station device 100 is also referred to as shared information. In a case where there is a change in the shared information, the information is re-shared each time the change occurs.

Configuration Information of a Guaranteed Resource

The first base station device 100 transmits, to the second base station device 100, configuration information of a guaranteed resource configured for the first base station device 100. The configuration information of the guaranteed resource includes at least one of the following information.

For example, the configuration information of the guaranteed resource includes information indicating a radio resource configured as the guaranteed resource. Such information includes information indicating a frequency and time of the radio resource configured as the guaranteed resource.

For example, the configuration information of the guaranteed resource includes information indicating a place where the configuration of the guaranteed resource is effective. Such information can include location information (latitude and longitude, and altitude) of the first base station device 100, a coverage range of the first base station device 100, and the like.

For example, the configuration information of the guaranteed resource can include information indicating a priority of a signal/information transmitted and received using the guaranteed resource. Such information may be information indicating a signal transmitted and received using the guaranteed resource.

For example, the configuration information of the guaranteed resource can include information indicating the type of the guaranteed resource described later.

Information for the Negotiation

The first base station device 100 and the second base station device 100 transmit and receive information for the negotiation described above. The information for the negotiation includes at least one of the following information.

For example, the information for the negotiation includes information for the negotiation before the configuration of the guaranteed resource described above. Specifically, the information for the negotiation includes information indicating a radio resource requested not to be configured as the guaranteed resource, or information indicating a radio resource permitted to be configured as the guaranteed resource.

For example, the information for the negotiation includes information for the negotiation after the configuration of the guaranteed resource described above. Specifically, the information for the negotiation includes information requesting a change of the guaranteed resource and information indicating whether or not to accept the request for a change of the guaranteed resource. The information for the negotiation includes information indicating acceptance/rejection of the restriction on the use of the guaranteed resource.

(6) Sharing Means

Various means for sharing the above-described shared information are conceivable.

The shared information may be transmitted and received wirelessly using a physical channel or a physical signal for sharing between operators. For example, the first base station device 100 (for example, the configuration unit 151) may transmit the configuration information to the second base station device 100 while including, in a radio signal, the configuration information. One example of the physical channel for sharing between operators is a PDSCH. One example of the physical channel for sharing between operators is a physical broadcast channel (PBCH). It is desirable that the physical channel for sharing between operators is scrambled by an ID for identifying an operator. Examples of the physical signal for sharing between operators include a discovery signal for notification of at least an ID (operator ID) for identifying an operator. It is desirable that the shared information is transmitted and received while being included in, for example, system information (MIB or SIB). However, the shared information may also be transmitted and received on a PDCCH. Preferably, the configuration information is transmitted periodically.

Note that the shared information may be transmitted while including not only information of a base station device 100 as a transmission source, but also information of another base station device 100. In other words, the shared information may be relayed and transmitted by another base station device 100. Specifically, the base station device 100A transmits the shared information of the base station device 100B together with or instead of its own shared information. A base station device 100C having difficulty in directly receiving the shared information from the base station device 100B can acquire the shared information of the base station device 100B via the base station device 100A. As a result, a more flexible cell design becomes possible.

The shared information may be transmitted and received using a backhaul line. That is, the first base station device 100 may transmit first shared information to the second base station device 100 using the backhaul line. The shared information is transmitted and received using the backhaul line (for example, an X2 interface or an Xn interface). The backhaul line may be wired or wireless. Before the sharing of the shared information, information for connecting the first base station device 100 and the second base station device 100 via the backhaul line may be shared. Examples of the information for connecting the first base station device 100 and the second base station device 100 via the backhaul line include identification information of an operator and identification information of the base station device 100. The first base station device 100 and the second base station device 100 establish connection of the X2 interface and the Xn interface based on the information. The information for connecting the first base station device 100 and the second base station device 100 via the backhaul line can be transmitted using a PDSCH. Alternatively, the information for connecting the first base station device 100 and the second base station device 100 via the backhaul line can be transmitted using a backhaul physical channel.

(7) Configuration Format of Guaranteed Resource

First Configuration Format

The guaranteed resource may be configured in advance. In other words, the guaranteed resource may be configured statically. For example, the first base station device 100 predicts a radio resource required for transmission and reception of a signal/information having a high priority and configures a guaranteed resource in advance. Typically, the first base station device 100 repeatedly configures a radio resource periodically, that is, at predetermined time intervals. The first base station device 100 transmits configuration information of the configured guaranteed resource to the second base station device 100. The first base station device 100 may transmit the configuration information periodically, or may omit the transmission of the configuration information to the second base station device 100 to which the configuration information is already transmitted once. The first base station device 100 transmits and receives a signal/information having a high priority by using the configured guaranteed resource.

The first base station device 100 and the second base station device 100 may perform the above-described negotiation before and after configuring the guaranteed resource. In a case where the guaranteed resource is statically configured, it is desirable to perform the negotiation before configuring the guaranteed resource.

Figure 7:
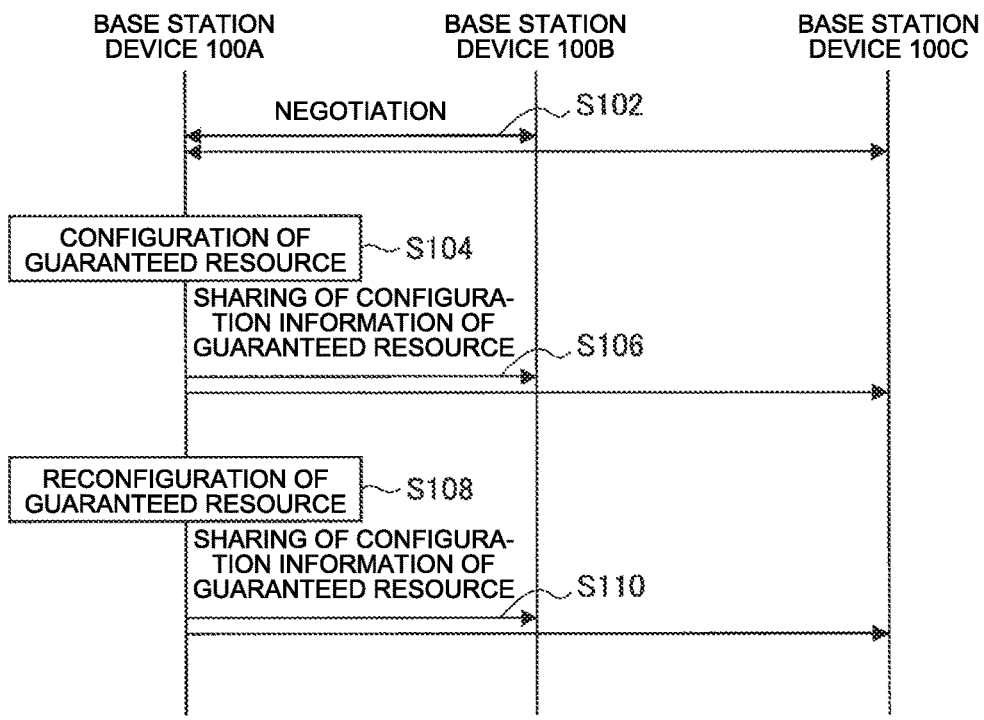
FIG. 7 is a sequence diagram for describing an example of a flow of static guaranteed resource configuration processing performed in the system according to the present embodiment.

Hereinafter, an example of a flow of processing for configuring a guaranteed resource in a first configuration format will be described with reference to FIG. 7. FIG. 7 is a sequence diagram for describing an example of a flow of static guaranteed resource configuration processing performed in the system 1 according to the present embodiment. The sequence involves the base station devices 100A, 100B, and 100C. The base station device 100A is the first base station device 100, and the base station devices 100B and 100C are the second base station devices 100. It is assumed that operators operating the base station devices 100A, 100B, and 100C, respectively, are different from one another.

As illustrated in FIG. 7, the base station devices 100A, 100B, and 100C mutually perform negotiation before configuring a guaranteed resource (Step S102). For example, the base station devices 100B and 100C transmit, to the base station device 100A, information indicating a radio resource requested not to be configured as the guaranteed resource, and information indicating a radio resource permitted to be configured as the guaranteed resource. Next, the base station device 100A configures the guaranteed resource (Step S104). For example, the base station device 100A configures a guaranteed resource for a signal/information having a high priority within a range of radio resources permitted to be configured as guaranteed resources, while avoiding a radio resource that is requested not to be configured as the guaranteed resource in Step S102. Next, the base station device 100A transmits configuration information of the configured guaranteed resource to the base station devices 100B and 100C (Step S106). Then, the base station device 100A transmits and receives the signal/information having a high priority to and from the terminal device 200 within the coverage by using the configured guaranteed resource.

Then, the base station device 100A reconfigures the guaranteed resource (Step S108). For example, in a case where the base station device 100A performs negotiation again with the base station device 100B or 100C, the reconfiguration of the guaranteed resource is performed. In this case, the base station device 100A reconfigures the guaranteed resource in the same manner as in Step S104 (Step S108). Next, the base station device 100A transmits configuration information of the reconfigured guaranteed resource to the base station devices 100B and 100C (Step S110). Then, the base station device 100A transmits and receives the signal/information having a high priority to and from the terminal device 200 within the coverage by using the reconfigured guaranteed resource.

Second Configuration Format

The guaranteed resource may be configured when there is a signal/information (or packet) to be transmitted and received using the guaranteed resource. In other words, the guaranteed resource may be configured dynamically. For example, the first base station device 100 configures a guaranteed resource when there is a signal/information having a high priority received by the first base station device 100 or the like. The first base station device 100 transmits configuration information of the configured guaranteed resource to the second base station device 100.

The first base station device 100 and the second base station device 100 may perform the above-described negotiation before and after configuring the guaranteed resource. In a case where the guaranteed resource is dynamically configured, it is desirable to perform the negotiation after configuring the guaranteed resource.

A guaranteed resource of one instance (a cluster of time resources) may be configured, or a guaranteed resource of a plurality of instances may be configured by using a second configuration format. In other words, the first base station device 100 may configure one future guaranteed resource or may configure a plurality of future guaranteed resources, by using the second configuration format.

Figure 8:
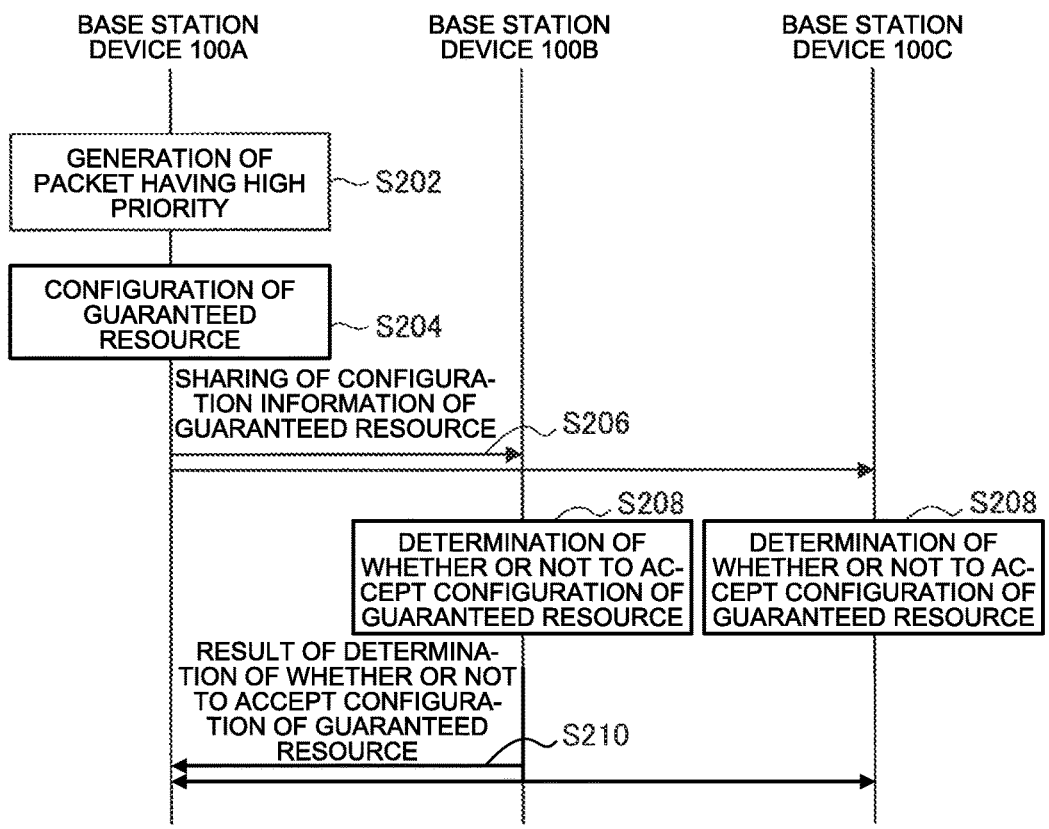
FIG. 8 is a sequence diagram for describing an example of a flow of dynamic guaranteed resource configuration processing performed in the system according to the present embodiment.

Hereinafter, an example of a flow of processing for configuring a guaranteed resource in the second configuration format will be described with reference to FIG. 8. FIG. 8 is a sequence diagram for describing an example of a flow of dynamic guaranteed resource configuration processing performed in the system 1 according to the present embodiment. The sequence involves the base station devices 100A, 100B, and 100C. The base station device 100A is the first base station device 100, and the base station devices 100B and 100C are the second base station devices 100. It is assumed that operators operating the base station devices 100A, 100B, and 100C, respectively, are different from one another.

As illustrated in FIG. 8, when there is a packet having a high priority (Step S202), the base station device 100A configures a guaranteed resource for transmitting and receiving the packet having a high priority (Step S204). Then, the base station devices 100A, 100B, and 100C perform negotiation after configuring the guaranteed resource.

Specifically, the base station device 100A transmits configuration information of the configured guaranteed resource to the base station devices 100B and 100C (Step S206). The base station devices 100B and 100C determine whether or not to accept the configuration of the guaranteed resource (Step S208). That is, the base station devices 100B and 100C determine whether or not to accept restriction on their own use of the guaranteed resource configured by the base station device 100A, respectively. Then, the base station devices 100B and 100C transmit, to the base station device 100A, a response indicating a result of the determination of whether or not to accept the configuration of the guaranteed resource (Step S210). In a case where the base station device 100A receives, from both the base station devices 100B and 100C, a response indicating acceptance of the configuration of the guaranteed resource, the base station device 100A transmits and receives a signal/information having a high priority by using the configured guaranteed resource. On the other hand, the base station device 100A does not preferentially use the guaranteed resource in a case where a response indicating rejection of the configuration of the guaranteed resource is received from at least one of the base station device 100B or the base station device 100C.

Third Configuration Format

The guaranteed resource may be configured again in a case where the first base station device 100 fails to use the guaranteed resource. The failure here is a failure in the negotiation after the configuration of the guaranteed resource described above (that is, a case where the response indicating rejection of the configuration of the guaranteed resource is received). In addition, the failure includes a case where it is difficult to use the configured guaranteed resource due to interference from another radio access technology (RAT) such as Wi-Fi (registered trademark). In other words, the guaranteed resource may be reconfigured according to the degree of channel congestion. The degree of channel congestion can be measured by the base station device 100 or the terminal device 200.

Fourth Configuration Format

The guaranteed resource may be reconfigured regularly (periodically). A reconfiguration period may be set in advance in the base station device 100, may be determined by negotiation between the base station devices 100, or may be uniquely determined by a predetermined base station device 100. Furthermore, the period may be determined depending on a change in the communication environment such as the degree of channel congestion or the movement of the base station device 100.

Fifth Configuration Format

The above-described first to fourth configuration formats may be appropriately combined. For example, the first base station device 100 dynamically configures a guaranteed resource at a timing when there is a signal/information having a high priority, while statically configuring a guaranteed resource. Further, the first base station device 100 may reconfigure the guaranteed resource in a case where the use of the guaranteed resource fails.

Note that, in a case where a predetermined environment change occurs at the time of the reconfiguration, the position, period, and/or proportion of the guaranteed resource may be changed. The case where a predetermined environment change occurs includes, for example, a case where a new base station device 100 is discovered. As a result, it becomes easy to adjust a resource allocation amount for the base station device 100 installed during operation each time, and fairness is ensured.

(8) Type of Guaranteed Resource

There may be multiple types of guaranteed resources. Configuration information of a guaranteed resource includes information indicating the type of the guaranteed resource. Multiple types of guaranteed resources can be configured according to a usage mode of the guaranteed resource. The first base station device 100 (for example, the communication processing unit 153) and the second base station device 100 (for example, the communication processing unit 153) control the use of the guaranteed resource based on the type of the guaranteed resource.

The type of the guaranteed resource may correspond to a signal to be transmitted and received. For example, the guaranteed resource may include a first type guaranteed resource and a second type guaranteed resource on which different signals are transmitted and received, respectively. The first base station device 100 transmits and receives a control signal/control information using the first type guaranteed resource. Here, the transmitted/received control signal/control information is a signal/information belonging to the control signal/control information among signals/information having a high priority. Such a signal/information is a signal essential for connection, such as a synchronization signal, a random access channel, paging, system information, or a reference signal. On the other hand, the first base station device 100 transmits and receives a data signal/data information using the second type guaranteed resource. Here, the transmitted/received data signal is a signal/information belonging to a data signal among signals/information having a high priority. Such a signal/information is a data signal requiring low delay.

The type of the guaranteed resource may correspond to a procedure for access to the guaranteed resource permitted to the second base station device 100. For example, the guaranteed resources may include a third type guaranteed resource and a fourth type guaranteed resource of which procedures (that is, channel access procedures) for access to the guaranteed resource permitted by the second base station device 100 are different. The second base station device 100 releases the third type guaranteed resource and does not use the third type guaranteed resource thereafter. In other words, the second base station device 100 has no means for using the third type guaranteed resource. On the other hand, the second base station device 100 releases the fourth type guaranteed resource, and then uses the fourth type guaranteed resource after performing carrier sensing.

As multiple types of guaranteed resources are configured according to the usage mode of the guaranteed resources as described above, the appropriate use of the guaranteed resources by the first base station device 100 and the second base station device 100 is implemented.

(9) Measurement Report

The first base station device 100 (for example, the configuration unit 151) may configure the guaranteed resource based on a result of measurement of a signal from the second base station device 100 performed by the terminal device 200 that performs communication with the first base station device 100. Specifically, the terminal device 200 (for example, the measurement report unit 241) measures a signal (for example, a measurement signal such as a discovery signal (DS) or a channel state information reference signal (CSI-RS)) for each operator. For example, the terminal device 200 that performs communication with (that is, connected to) the first base station device 100 measures a signal from the second base station device 100. The measurement performed by the terminal device 200 includes radio resource management (RRM) (measurement of reference signal received power (RSRP), reference signal received quality (RSRQ), received signal strength indicator (RSSI), or the like) or CSI measurement. The measurement signal includes identification information (for example, an operator ID) for identifying the second base station device 100 as a transmission source, and the terminal device 200 identifies a signal for each operator based on the identification information. Then, the terminal device 200 reports the measurement result to the first base station device 100 to which the terminal device 200 is connected. Then, the first base station device 100 configures the guaranteed resource based on the received measurement report. As a result, the first base station device 100 can configure the guaranteed resource in accordance with interference from the second base station device 100 at the location of the terminal device 200.

Figure 9:
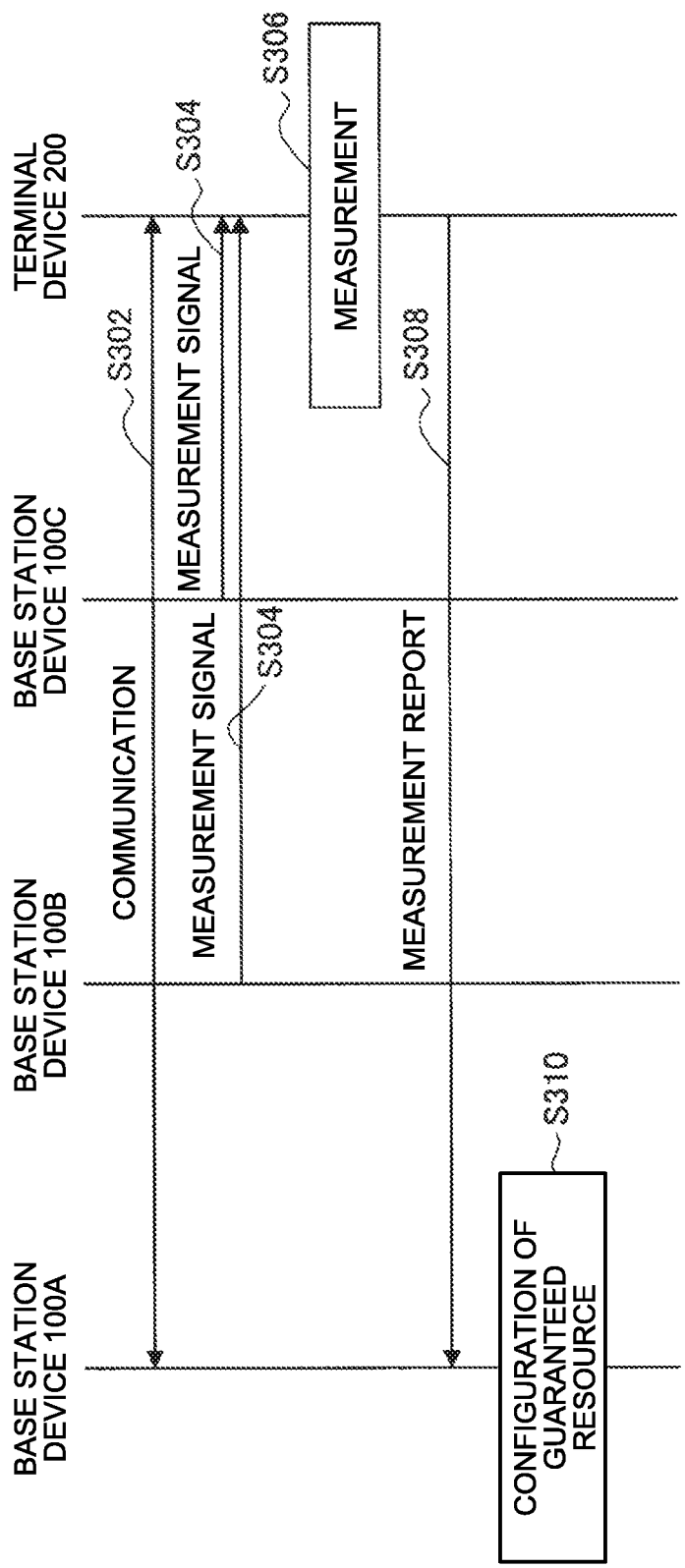
FIG. 9 is a sequence diagram for describing an example of a flow of guaranteed resource configuration processing based on a measurement report performed in the system according to the present embodiment.

Hereinafter, an example of a flow of guaranteed resource configuration processing based on the measurement report performed by the terminal device 200 will be described with reference to FIG. 9. FIG. 9 is a sequence diagram for describing an example of a flow of guaranteed resource configuration processing based on a measurement report performed in the system 1 according to the present embodiment. The sequence involves the base station devices 100A, 100B and 100C and the terminal device 200. The base station device 100A is the first base station device 100, and the base station devices 100B and 100C are the second base station devices 100. It is assumed that operators operating the base station devices 100A, 100B, and 100C, respectively, are different from one another. Further, it is assumed that terminal device 200 is connected to the base station device 100A.

As illustrated in FIG. 9, the base station device 100A and the terminal device 200 are already connected to each other and currently perform communication with each other (Step S302). The base station devices 100B and 100C each transmit a measurement signal (Step S304). The terminal device 200 performs measurement based on these measurement signals (Step S306). Here, the terminal device 200 identifies the base station devices 100B and 100C as transmission sources of the measurement signals based on operator IDs included in the measurement signals, and performs measurement for each of the base station devices 100B and 100C. Then, the terminal device 200 transmits a measurement report including a measurement result to the base station device 100A (Step S308). The base station device 100A configures a guaranteed resource based on the received measurement report (Step S310).

(10) Frame Synchronization/Time Synchronization

The first base station device 100 and the second base station device 100 may perform frame synchronization and/or time synchronization.

By doing so, the first base station device 100 and the second base station device 100 can transmit and receive a signal to and from the terminal device 200 at the same timing. Therefore, the first base station device 100 and the second base station device 100, that is, different operators can perform advanced cooperation. Examples of the advanced cooperation include inter-cell interference coordination (ICIC) and coordinated multi-point transmission and reception (CoMP).

Furthermore, the first base station device 100 and the second base station device 100 can perform the LBT in cooperation. For example, the first base station device 100 and the second base station device 100 can transmit and receive signals at the same timing by adjusting an end timing of the LBT to be the same. This improves a spatial resource and cell throughput per unit density.

(11) Other Examples of Shared Information

As the shared information, information other than the information on the guaranteed resource may be shared. That is, information other than the information on the guaranteed resource may be shared between different operators. An example of such information will be described below.

The Type of the Terminal Device 200, the Type of the QoS of the Packet, and/or the Traffic Volume The type of the terminal device 200, the type of the QoS of the packet, and/or the traffic volume may be shared between different operators.

For example, the traffic volume for each use case of eMBB/URLLC/mMTC may be shared. Further, the traffic volume for each QCI may be shared. The QCI is an index indicating a QoS parameter of each of guaranteed bitrate resource (GBR)/non-GBR, a priority, and an assumed delay time. The QCI is added for each packet. The QCI is defined for an assumed service. The base station device 100 performs scheduling based on the QoS parameter associated with the QCI. Table 3 is an example of a table showing correspondence between QCIs and QoS parameters.

TABLE 3

Example of Table Showing Correspondence between QCIs and QoS Parameters
(3GPP TS 23.203, V 15.0.0 (September 2017), corresponding to table 6.1.7)

| QCI | Resource Type | Priority Level | Packet Delay Budget | Packet Error Loss Rate | Example Services |
|---|---|---|---|---|---|
| 1 | GBR | 2 | 100 ms | $10^{-2}$ | Conversational Voice |
| 2 | (Guaranteed bitrate resource) | 4 | 150 ms | $10^{-3}$ | Conversational Video (Live Streaming) |

TABLE 3-continued

Example of Table Showing Correspondence between QCIs and QoS Parameters
(3GPP TS 23.203, V 15.0.0 (September 2017), corresponding to table 6.1.7)

| QCI | Resource Type | Priority Level | Packet Delay Budget | Packet Error Loss Rate | Example Services |
|---|---|---|---|---|---|
| 3 | | 3 | 50 ms | $10^{-3}$ | Real Time Gaming, V2X messages |
| 4 | | 5 | 300 ms | $10^{-6}$ | Non-Conversational Video (Buffered Streaming) |
| 65 | | 0.7 | 75 ms | $10^{-2}$ | Mission Critical user plane Push To Talk voice (e.g., MCPTT) |
| 66 | | 2 | 100 ms | $10^{-2}$ | Non-Mission Critical user plane Push To Talk voice |
| 75 | | 2.5 | 50 ms | $10^{-2}$ | V2X messages |
| 5 | Non-GBR | 1 | 100 ms | $10^{-6}$ | IMS Signalling |
| 6 | | 6 | 300 ms | $10^{-6}$ | Video (Buffered Streaming) TCP-based (e.g., www, e-mail, chat, ftp, p2p file sharing, progressive video, etc.) |
| 7 | | 7 | 100 ms | $10^{-3}$ | Voice, Video (Live Streaming) Interactive Gaming |
| 8 | | 8 | 300 ms | $10^{-6}$ | Video (Buffered Streaming) TCP-based (e.g., www, e-mail, chat, ftp, p2p file sharing, progressive video, etc.) |
| 9 | | 9 | | | |
| 69 | | 0.5 | 60 ms | $10^{-6}$ | Mission Critical delay sensitive signaling (e.g., MC-PTT signaling) |
| 70 | | 5.5 | 200 ms | $10^{-6}$ | Mission Critical Data (e.g. example services are the same as QCI 6/8/9) |
| 79 | | 6.5 | 50 ms | $10^{-2}$ | V2X messages |

Processing Capability of the Base Station Device 100

The processing capability of the base station device 100 may be shared between different operators.

For example, capability information of the base station device 100 can be shared between different operators. Examples of the capability information of the base station device 100 include interference canceller capability, information on a base station antenna, and information on the number of antennas, a beam width, and directivity.

Communication Environment Around the Base Station Device 100

The communication environment around the base station device 100 may be shared between different operators.

For example, a measurement report received from the terminal device 200 connected to the base station device 100 may be shared between different operators. Accordingly, the base station device 100 can also collect measurement reports from terminal devices 200 of different operators. Therefore, the base station device 100 can more efficiently perform scheduling of radio resources. Further, information on a location of the base station device 100 may be shared. By doing so, the base station device 100 can more accurately recognize the surrounding communication environment.

Information on a Time (Time Stamp) for Performing Time Synchronization

Information on a time (time stamp) for performing time synchronization may be shared between different operators.

In a case where time synchronization is performed between different operators, information on a time stamp is shared. The information on a time stamp may be information indicating an absolute time or information indicating a reference time.

Parameters Related to the LBT

Parameters related to the LBT may be shared between different operators.

Examples of the parameters related to the LBT include a maximum transmission power of the base station device 100, a maximum antenna gain, a maximum beamforming gain, a contention window, and a random backoff counter value. As these parameters related to the LBT are shared between different operators, a space reuse (frequency reuse) rate, which is a factor of using the same frequency band in different spaces, can be improved, and frequency use efficiency per unit area can be improved.

RRC Configuration Information of the Base Station Device 100

A part of RRC configuration in the base station device 100 may be shared between different operators.

For example, a part of the RRC configuration in the base station device 100 is shared between different operators. Examples of the part of the RRC configuration include a cell ID (physical cell ID) of the base station device 100 and a resource configured for a physical channel/signal. As a result cell design and radio resource management of different operators are facilitated. Further, the RRC configuration (a random access channel (RACH) resource, a RACH index, or the like) related to the RACH may be shared. As a result, a handover (cell connection switching) between base stations of different operators is facilitated.

Note that an operation related to the guaranteed resource is also applicable to vehicle-to-everything communication (V2X). The V2X includes vehicle-to-vehicle communication (V2V), vehicle-to-infrastructure communication (V2I), and vehicle-to-network communication (V2N).

A similar effect can be obtained also in an intelligence transportation systems (ITS) band (a frequency band of 5.85 to 5.925 GHz) by replacing the operation of the base station device 100 described above with an operation of a vehicle-type terminal. A predetermined vehicle-type terminal configures a guaranteed resource and notifies the surrounding vehicle-type terminals of the guaranteed resource, thereby making it possible to reduce interference of an emergency (safety) message such as an emergency break signal, a steering assist signal, and an automatic pilot signal.

4. Application Examples

The technology according to the present disclosure is applicable to various products. For example, the base station device 100 may be implemented by any type of evolved Node B (eNB) such as a macro eNB or a small eNB. The small eNB may be an eNB that covers a cell smaller than a macro cell, such as a pico eNB, a micro eNB, or a home (femto) eNB. Instead, the base station device 100 may be implemented by another type of base station such as a NodeB or a base transceiver station (BTS). The base station device 100 may include a main body (also referred to as base station device) that controls radio communication, and one or more remote radio heads (RRHs) that are arranged in different locations from that of the main body. Further, various types of terminals to be described later may be operated as the base station device 100 by temporarily or semi-permanently performing the base station function.

Further, for example, the terminal device 200 may be implemented by a smartphone, a tablet personal computer (PC), a notebook PC, a portable game terminal, a mobile terminal such as a mobile/dongle router or a digital camera, or an in-vehicle terminal such as a car navigation device. Further, the terminal device 200 may be implemented by a terminal (also referred to as a machine type communication (MTC) terminal) that performs machine-to-machine (M2M) communication. Furthermore, the terminal device 200 may be a radio communication module (for example, an integrated circuit module configured with one die) mounted on these terminals.

4.1. Application Examples of Base Station Device

First Application Example

Figure 10:
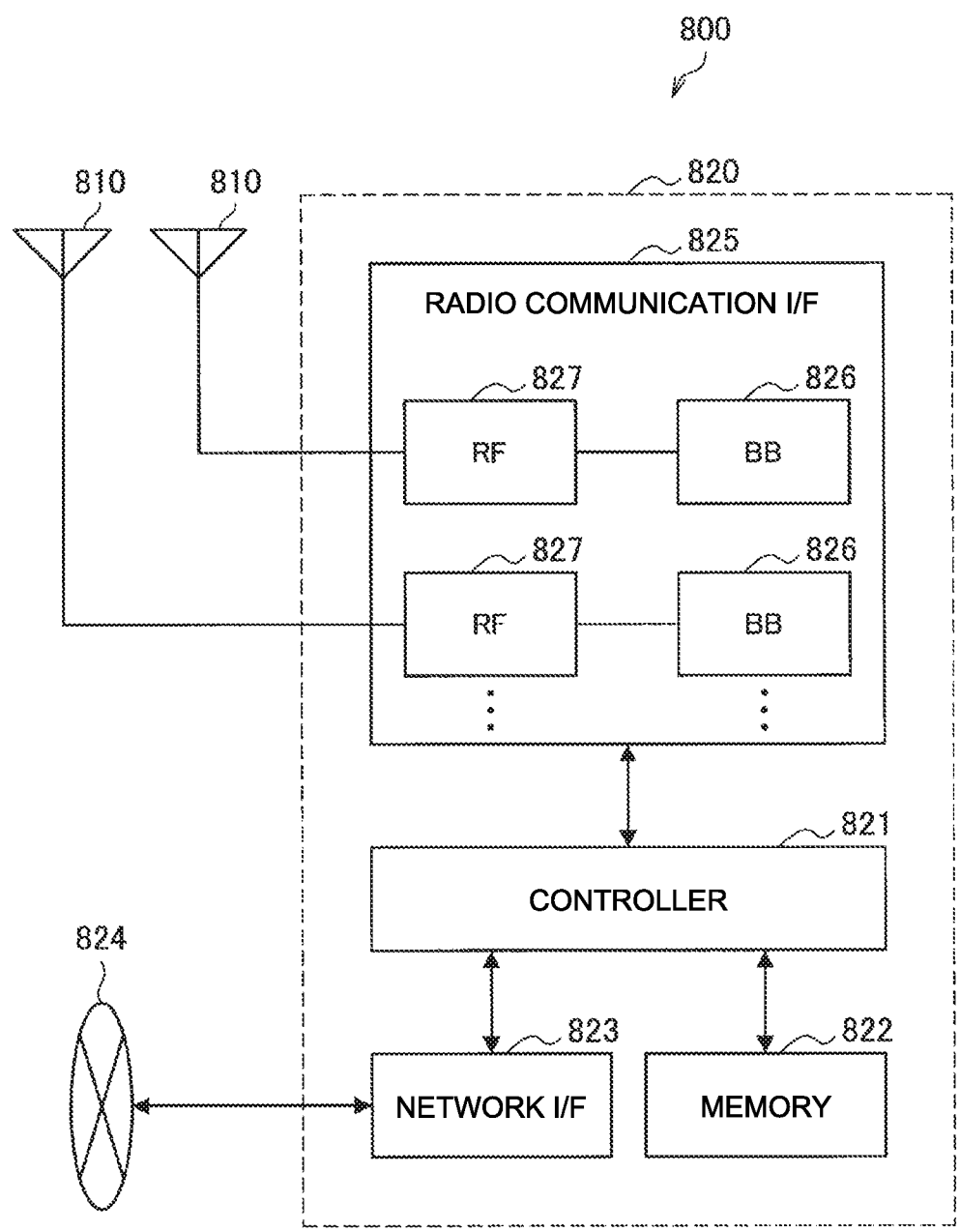
FIG. 10 is a block diagram illustrating a first example of a schematic configuration of an eNB.

FIG. 10 is a block diagram illustrating a first example of a schematic configuration of an eNB to which the technology according to the present disclosure can be applied. An eNB 800 includes one or more antennas 810 and a base station device 820. Each antenna 810 and the base station device 820 can be connected to each other via a radio frequency (RF) cable.

Each of the antennas 810 includes a single or a plurality of antenna elements (for example, a plurality of antenna elements constituting a multiple-input and multiple-output (MIMO) antenna), and is used for transmission and reception of a radio signal by the base station device 820. The eNB 800 includes the plurality of antennas 810 as illustrated in FIG. 10, and the plurality of antennas 810 may correspond to, for example, a plurality of frequency bands used by the eNB 800, respectively. Note that, although FIG. 10 illustrates an example in which the eNB 800 includes a plurality of antennas 810, the eNB 800 may include a single antenna 810.

The base station device 820 includes a controller 821, a memory 822, a network interface 823, and a radio communication interface 825.

The controller 821 may be, for example, a central processing unit (CPU) or a digital signal processor (DSP), and causes various functions of a higher layer of the base station device 820 to be performed. For example, the controller 821 generates a data packet from data in a signal processed by the radio communication interface 825, and transfers the generated packet via the network interface 823. The controller 821 may generate a bundled packet by bundling data from a plurality of baseband processors, and transfer the generated bundled packet. Further, the controller 821 may have a logical function of performing a control such as radio resource control, radio bearer control, mobility management, admission control, or scheduling. Further, the control may be performed in cooperation with a surrounding eNB or a core network node. The memory 822 includes a random access memory (RAM) and a read only memory (ROM), and stores a program executed by the controller 821 and various control data (for example, a terminal list, transmission power data, and scheduling data).

The network interface 823 is a communication interface for connecting the base station device 820 to a core network 824. The controller 821 may perform communication with a core network node or another eNB via the network interface 823. In this case, the eNB 800 and the core network node or another eNB may be connected to each other by a logical interface (for example, an S1 interface or an X2 interface). The network interface 823 may be a wired communication interface or a radio communication interface for wireless backhaul. In a case where the network interface 823 is a radio communication interface, the network interface 823 may use a higher frequency band than a frequency band used by the radio communication interface 825, for radio communication.

The radio communication interface 825 supports any one of cellular communication schemes such as Long Term Evolution (LTE) and LTE-Advanced, and provides radio connection to a terminal located in a cell of the eNB 800 via the antenna 810. Typically, the radio communication interface 825 can include a baseband (BB) processor 826, an RF circuit 827, and the like. The BB processor 826 may perform encoding/decoding, modulation/demodulation, multiplexing/demultiplexing, and the like, and performs various signal processing of each layer (for example, L1, medium access control (MAC), radio link control (RLC), or packet data convergence protocol (PDCP)). The BB processor 826 may have some or all of the above-described logical functions, instead of the controller 821. The BB processor 826 may be a module including a memory that stores a communication control program, a processor that executes the program, and related circuits, and the function of the BB processor 826 may be changed by updating the program. Further, the module may be a card or a blade inserted into a slot of the base station device 820, or may be a chip mounted on the card or the blade. On the other hand, the RF circuit 827 may include a mixer, a filter, an amplifier, and the like, and transmits and receives a radio signal via the antenna 810.

The radio communication interface 825 includes a plurality of BB processors 826 as illustrated in FIG. 10, and the plurality of BB processors 826 may correspond to, for example, a plurality of frequency bands used by the eNB 800, respectively. Further, the radio communication interface 825 includes a plurality of RF circuits 827 as illustrated in FIG. 10, and the plurality of RF circuits 827 may correspond to, for example, a plurality of antenna elements, respectively. Note that, although FIG. 10 illustrates an example in which the radio communication interface 825 includes a plurality of BB processors 826 and a plurality of RF circuits 827, the radio communication interface 825 may include a single BB processor 826 or a single RF circuit 827.

In the eNB 800 illustrated in FIG. 10, one or more components (the configuration unit 151 and/or the communication processing unit 153) included in the control unit 150 described with reference to FIG. 3 may be implemented in the radio communication interface 825. Alternatively, at least some of these components may be implemented in the controller 821. As an example, in the eNB 800, a module including a part (for example, the BB processor 826) of the radio communication interface 825 or the entire radio communication interface 825, and/or the controller 821 may be mounted, and the one or more components may be implemented in the module. In this case, the module may store a program for causing a processor to function as the one or more components (in other words, a program for causing a processor to performs the operations of the one or more components) and execute the program. As another example, a program for causing a processor to function as the one or more components may be installed in the eNB 800, and the radio communication interface 825 (for example, the BB processor 826) and/or the controller 821 may execute the program. As described above, the eNB 800, the base station device 820, or the module may be provided as a device including the one or more components, or a program for causing a processor to function as the one or more components may be provided. Further, a readable recording medium on which the program is recorded may be provided.

Further, in the eNB 800 illustrated in FIG. 10, the radio communication unit 120 described with reference to FIG. 3 may be implemented in the radio communication interface 825 (for example, the RF circuit 827). Further, the antenna unit 110 may be implemented in the antenna 810. Further, the network communication unit 130 may be implemented in the controller 821 and/or the network interface 823. Further, the storage unit 140 may be implemented in the memory 822.

Second Application Example

Figure 11:
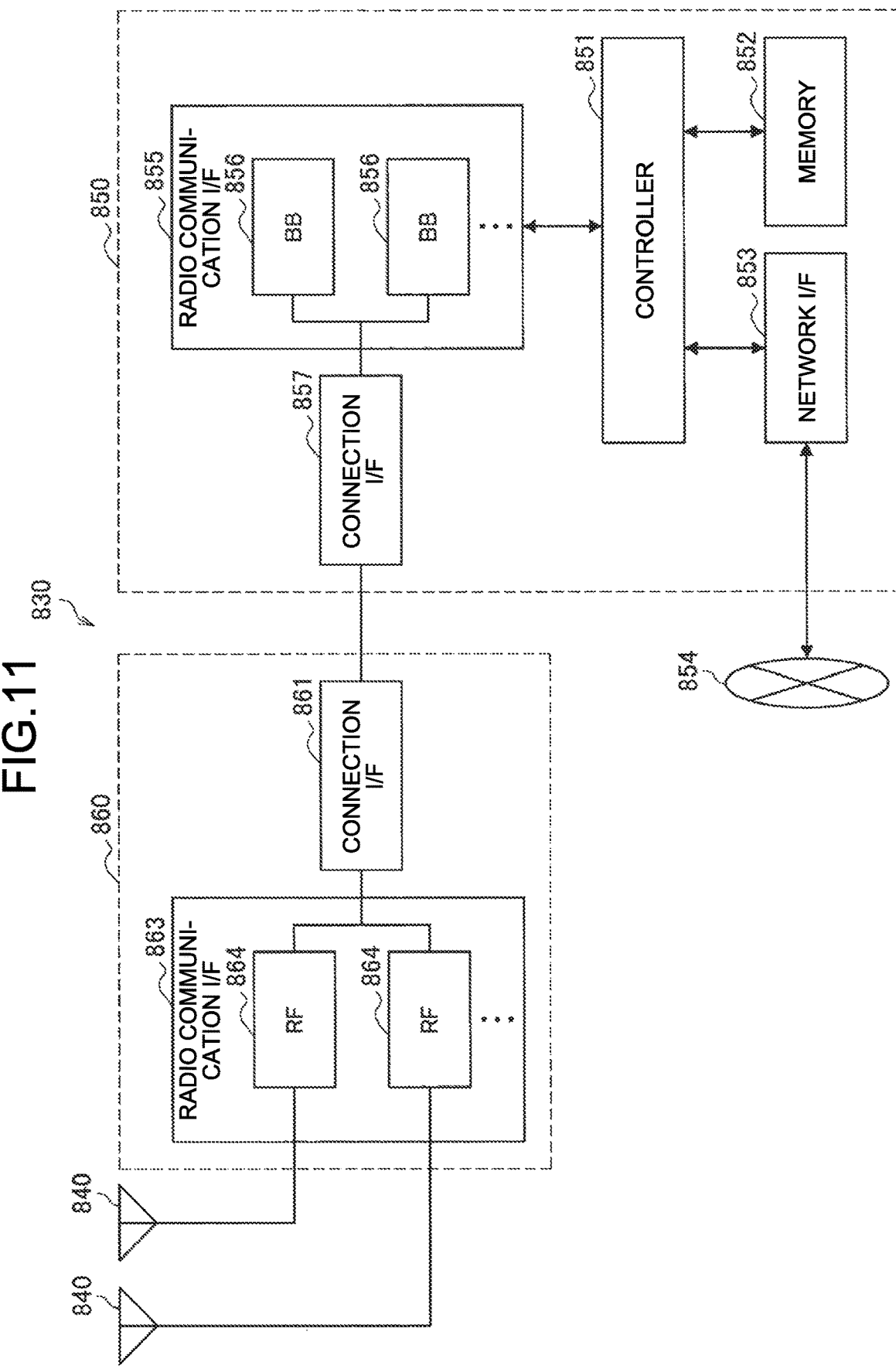
FIG. 11 is a block diagram illustrating a second example of a schematic configuration of the eNB.

FIG. 11 is a block diagram illustrating a second example of a schematic configuration of the eNB to which the technology according to the present disclosure can be applied. An eNB 830 includes one or more antennas 840, a base station device 850, and an RRH 860. Each antenna 840 and the RRH 860 may be connected to each other via an RF cable. Further, the base station device 850 and the RRH 860 can be connected to each other via a high-speed line such as an optical fiber cable.

Each of the antennas 840 includes a single or a plurality of antenna elements (for example, a plurality of antenna elements constituting a MIMO antenna), and is used for transmission and reception of a radio signal by the RRH 860. The eNB 830 includes the plurality of antennas 840 as illustrated in FIG. 11, and the plurality of antennas 840 may correspond to, for example, a plurality of frequency bands used by the eNB 830, respectively. Note that, although FIG. 11 illustrates an example in which the eNB 830 includes a plurality of antennas 840, the eNB 830 may include a single antenna 840.

The base station device 850 includes a controller 851, a memory 852, a network interface 853, a radio communication interface 855, and a connection interface 857. The controller 851, the memory 852, and the network interface 853 are similar to the controller 821, the memory 822, and the network interface 823 described with reference to FIG. 10.

The radio communication interface 855 supports any one of cellular communication schemes such as LTE and LTE-Advanced, and provides radio connection to a terminal located in a sector of the RRH 860 via the RRH 860 and the antenna 840. Typically, the radio communication interface 855 may include a BB processor 856 and the like. The BB processor 856 is similar to the BB processor 826 described with reference to FIG. 10 except that the BB processor 856 is connected to the RF circuit 864 of the RRH 860 via the connection interface 857. The radio communication interface 855 includes a plurality of BB processors 856 as illustrated in FIG. 11, and the plurality of BB processors 856 may correspond to, for example, a plurality of frequency bands used by the eNB 830. Note that, although FIG. 11 illustrates an example in which the radio communication interface 855 includes a plurality of BB processors 856, the radio communication interface 855 may include a single BB processor 856.

The connection interface 857 is an interface for connecting the base station device 850 (radio communication interface 855) to the RRH 860. The connection interface 857 may be a communication module for communication on the high-speed line that connects the base station device 850 (radio communication interface 855) and the RRH 860 to each other.

Further, the RRH 860 includes a connection interface 861 and a radio communication interface 863.

The connection interface 861 is an interface for connecting the RRH 860 (radio communication interface 863) to the base station device 850. The connection interface 861 may be a communication module for communication on the high-speed line.

The radio communication interface 863 transmits and receives a radio signal via the antenna 840. Typically, the radio communication interface 863 may include an RF circuit 864 and the like. The RF circuit 864 may include a mixer, a filter, an amplifier, and the like, and transmits and receives a radio signal via the antenna 840. The radio communication interface 863 includes a plurality of RF circuits 864 as illustrated in FIG. 11, and the plurality of RF circuits 864 may correspond to, for example, a plurality of antenna elements, respectively. Note that, although FIG. 11 illustrates an example in which the radio communication interface 863 includes a plurality of RF circuits 864, the radio communication interface 863 may include a single RF circuit 864.

In the eNB 830 illustrated in FIG. 11, one or more components (the configuration unit 151 and/or the communication processing unit 153) included in the control unit 150 described with reference to FIG. 3 may be implemented in the radio communication interface 855 and/or the radio communication interface 863. Alternatively, at least some of these components may be implemented in the controller 851. As an example, in the eNB 830, a module including a part (for example, the BB processor 856) of the radio communication interface 855 or the entire radio communication interface 855, and/or the controller 851 may be mounted, and the one or more components may be implemented in the module. In this case, the module may store a program for causing a processor to function as the one or more components (in other words, a program for causing a processor to performs the operations of the one or more components) and execute the program. As another example, a program for causing a processor to function as the one or more components may be installed in the eNB 830, and the radio communication interface 855 (for example, the BB processor 856) and/or the controller 851 may execute the program. As described above, the eNB 830, the base station device 850, or the module may be provided as a device including the one or more components, or a program for causing a processor to function as the one or more components may be provided. Further, a readable recording medium on which the program is recorded may be provided.

Further, in the eNB 830 illustrated in FIG. 11, for example, the radio communication unit 120 described with reference to FIG. 3 may be implemented in the radio communication interface 863 (for example, the RF circuit 864). Further, the antenna unit 110 may be implemented in the antenna 840. Further, the network communication unit 130 may be implemented in the controller 851 and/or the network interface 853. Further, the storage unit 140 may be implemented in the memory 852.

4.2. Application Examples of Terminal Device

First Application Example

Figure 12:
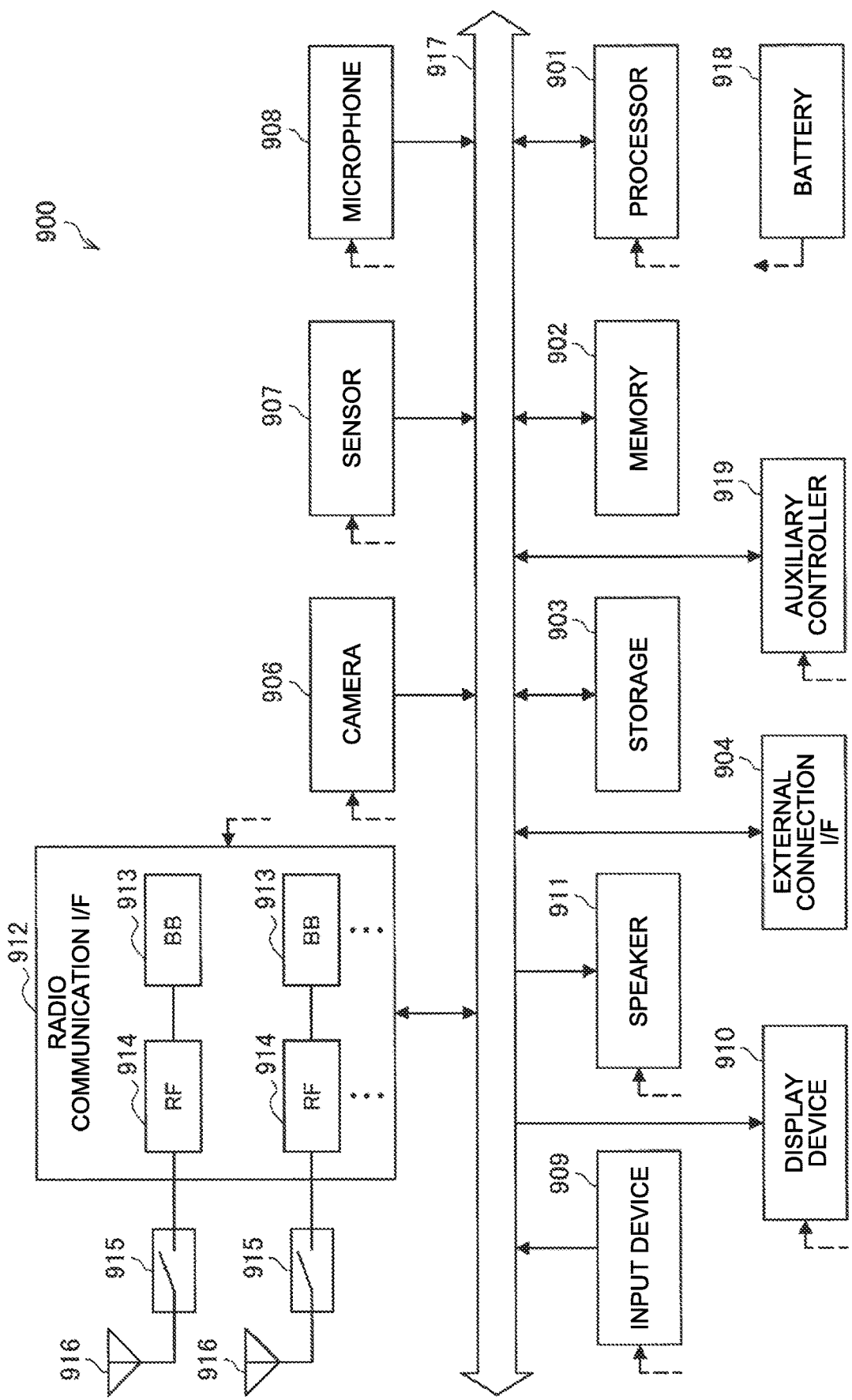
FIG. 12 is a block diagram illustrating an example of a schematic configuration of a smartphone.

FIG. 12 is a block diagram illustrating an example of a schematic configuration of a smartphone 900 to which the technology according to the present disclosure can be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on chip (SoC), and controls functions of an application layer and other layers of the smartphone 900. The memory 902 includes a RAM and a ROM, and stores a program executed by the processor 901 and data. The storage 903 can include a storage medium such as a semiconductor memory or a hard disk. The external connection interface 904 is an interface for connecting an external device such as a memory card or a universal serial bus (USB) device to the smartphone 900.

The camera 906 includes an image sensor such as a charge coupled device (CCD) or a complementary metal oxide semiconductor (CMOS), and generates a captured image. The sensor 907 can include, for example, a sensor group of a positioning sensor, a gyro sensor, a geomagnetic sensor, an acceleration sensor, and the like. The microphone 908 converts audio input to the smartphone 900 into an audio signal. The input device 909 includes, for example, a touch sensor that detects a touch on a screen of the display device 910, a keypad, a keyboard, a button, or a switch, and receives an operation or information input from a user. The display device 910 includes a screen such as a liquid crystal display (LCD) or an organic light emitting diode (OLED) display, and displays an output image of the smartphone 900. The speaker 911 converts an audio signal output from smartphone 900 into audio.

The radio communication interface 912 supports any one of the cellular communication schemes such as LTE and LTE-Advanced, and performs radio communication. Typically, the radio communication interface 912 can include a BB processor 913, an RF circuit 914, and the like. The BB processor 913 may perform encoding/decoding, modulation/demodulation, multiplexing/demultiplexing, and the like, and performs various signal processing for radio communication. On the other hand, the RF circuit 914 may include a mixer, a filter, an amplifier, and the like, and transmits and receives a radio signal via the antenna 916. The radio communication interface 912 may be a one-chip module in which the BB processor 913 and the RF circuit 914 are integrated. The radio communication interface 912 may include a plurality of BB processors 913 and a plurality of RF circuits 914 as illustrated in FIG. 12. Note that, although FIG. 12 illustrates an example in which the radio communication interface 912 includes a plurality of BB processors 913 and a plurality of RF circuits 914, the radio communication interface 912 may include a single BB processor 913 or a single RF circuit 914.

Furthermore, the radio communication interface 912 may support other types of radio communication schemes such as a short-range radio communication scheme, a near field radio communication scheme, and a wireless local area network (LAN) scheme, in addition to the cellular communication scheme, and in this case, a BB processor 913 and an RF circuit 914 may be included for each radio communication scheme.

Each of the antenna switches 915 switches a connection destination of the antenna 916 among a plurality of circuits (for example, circuits for different radio communication schemes) included in the radio communication interface 912.

Each of the antennas 916 includes a single or a plurality of antenna elements (for example, a plurality of antenna elements constituting a MIMO antenna), and is used for transmission and reception of a radio signal by the radio communication interface 912. The smartphone 900 may include a plurality of antennas 916 as illustrated in FIG. 12. Note that, although FIG. 12 illustrates an example in which the smartphone 900 includes a plurality of antennas 916, the smartphone 900 may include a single antenna 916.

Further, the smartphone 900 may include an antenna 916 for each radio communication scheme. In this case, the antenna switch 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to one another. The battery 918 supplies power to each block of the smartphone 900 illustrated in FIG. 12 via a power supply line partially indicated by a broken line in FIG. 12. The auxiliary controller 919 causes minimum necessary functions of the smartphone 900 to be performed in, for example, a sleep mode.

In the smartphone 900 illustrated in FIG. 12, one or more components (the measurement report unit 241 and/or the communication processing unit 243) included in the control unit 240 described with reference to FIG. 4 may be implemented in the radio communication interface 912. Alternatively, at least some of these components may be implemented in the processor 901 or the auxiliary controller 919. As an example, in the smartphone 900, a module including a part (for example, the BB processor 913) of the radio communication interface 912 or the entire radio communication interface 912, the processor 901, and/or the auxiliary controller 919 may be mounted, and the one or more components may be implemented in the module. In this case, the module may store a program for causing a processor to function as the one or more components (in other words, a program for causing a processor to performs the operations of the one or more components) and execute the program. As another example, a program for causing a processor to function as the one or more components may be installed in the smartphone 900, and the radio communication interface 912 (for example, the BB processor 913), the processor 901, and/or the auxiliary controller 919 may execute the program. As described above, the smartphone 900 or the module may be provided as a device including the one or more components, and a program for causing a processor to function as the one or more components may be provided. Further, a readable recording medium on which the program is recorded may be provided.

Further, in the smartphone 900 illustrated in FIG. 12, for example, the radio communication unit 220 described with reference to FIG. 4 may be implemented in the radio communication interface 912 (for example, the RF circuit 914). Further, the antenna unit 210 may be implemented in the antenna 916. Further, the storage unit 230 may be implemented in the memory 902.

Second Application Example

Figure 13:
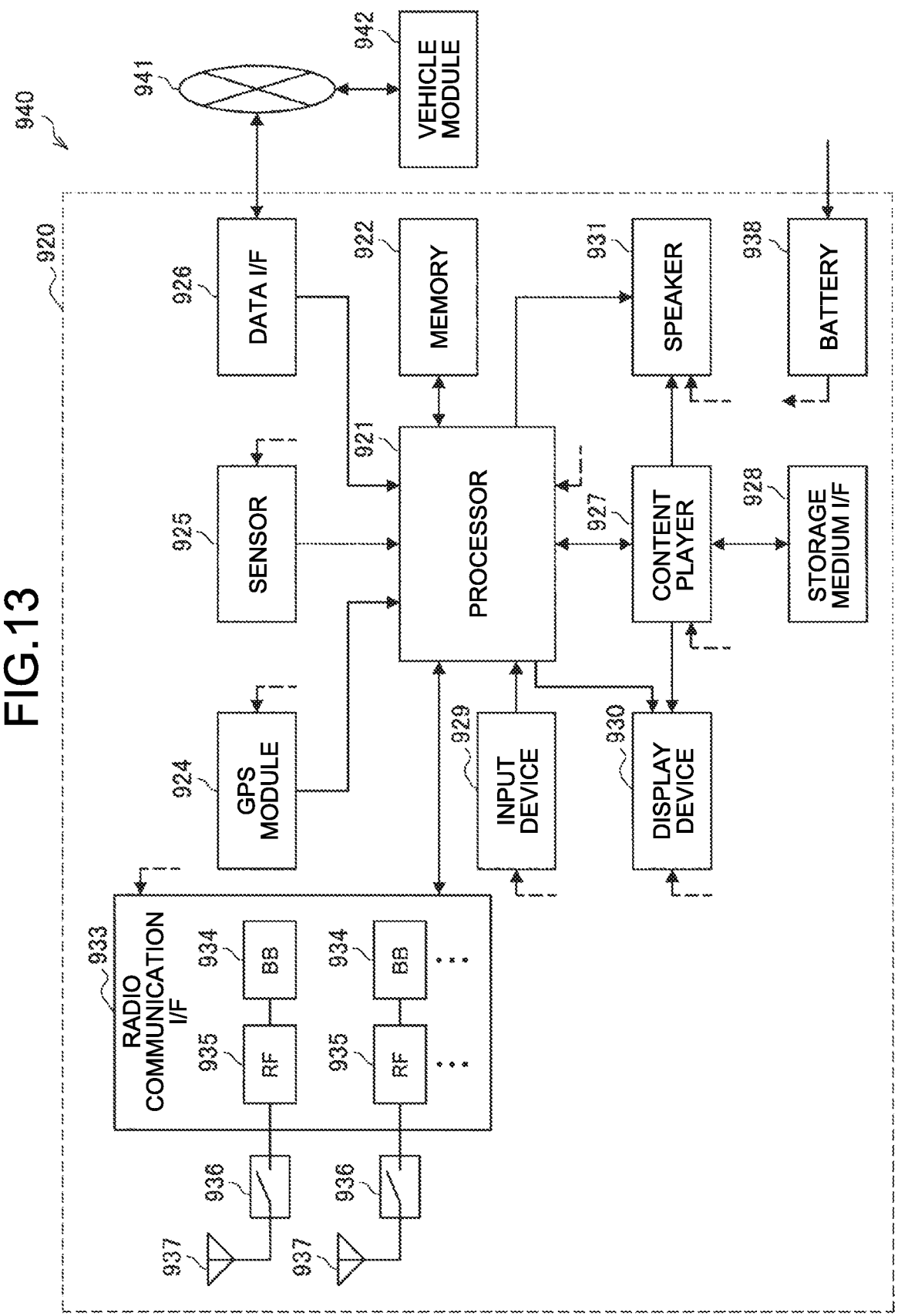
FIG. 13 is a block diagram illustrating an example of a schematic configuration of a car navigation device.

FIG. 13 is a block diagram illustrating an example of a schematic configuration of a car navigation device 920 to which the technology according to the present disclosure can be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or an SoC, and controls a navigation function and other functions of the car navigation device 920. The memory 922 includes a RAM and a ROM, and stores a program executed by the processor 921 and data.

The GPS module 924 measures a location (for example, a latitude, a longitude, and an altitude) of the car navigation device 920 using a GPS signal received from a GPS satellite. The sensor 925 can include, for example, a sensor group of a gyro sensor, a geomagnetic sensor, and a barometric pressure sensor. The data interface 926 is connected to, for example, an in-vehicle network 941 via a terminal (not illustrated), and acquires data generated in a vehicle such as vehicle speed data.

The content player 927 reproduces a content stored on a storage medium (for example, a compact disc (CD) or a digital versatile disc (DVD)) inserted into the storage medium interface 928. The input device 929 includes, for example, a touch sensor that detects a touch on a screen of the display device 930, a button, or a switch, and receives an operation or information input from a user. The display device 930 includes a screen such as an LCD or an OLED display, and displays a navigation function or an image of a reproduced content. The speaker 931 outputs the navigation function or audio of a reproduced content.

The radio communication interface 933 supports any one of cellular communication schemes such as LTE and LTE-Advanced, and performs radio communication. Typically, the radio communication interface 933 can include a BB processor 934, an RF circuit 935, and the like. The BB processor 934 may perform, for example, encoding/decoding, modulation/demodulation, multiplexing/demultiplexing, and the like, and performs various signal processing for radio communication. On the other hand, the RF circuit 935 may include a mixer, a filter, an amplifier, and the like, and transmits and receives a radio signal via the antenna 937. The radio communication interface 933 may be a one-chip module in which the BB processor 934 and the RF circuit 935 are integrated. The radio communication interface 933 may include a plurality of BB processors 934 and a plurality of RF circuits 935 as illustrated in FIG. 13. Note that, although FIG. 13 illustrates an example in which the radio communication interface 933 includes a plurality of BB processors 934 and a plurality of RF circuits 935, the radio communication interface 933 may include a single BB processor 934 or a single RF circuit 935.

Furthermore, the radio communication interface 933 may support other types of radio communication schemes such as a short-range radio communication scheme, a near field radio communication scheme, and a wireless LAN scheme, in addition to the cellular communication scheme, and in this case, a BB processor 934 and an RF circuit 935 may be included for each radio communication scheme.

Each of the antenna switches 936 switches a connection destination of the antenna 937 among a plurality of circuits (for example, circuits for different radio communication schemes) included in the radio communication interface 933.

Each of the antennas 937 includes a single or a plurality of antenna elements (for example, a plurality of antenna elements constituting a MIMO antenna), and is used for transmission and reception of a radio signal by the radio communication interface 933. The car navigation device 920 may include a plurality of antennas 937 as illustrated in FIG. 13. Note that although FIG. 13 illustrates an example in which the car navigation device 920 includes a plurality of antennas 937, the car navigation device 920 may include a single antenna 937.

Further, the car navigation device 920 may include an antenna 937 for each radio communication scheme. In this case, the antenna switch 936 may be omitted from the configuration of the car navigation device 920.

The battery 938 supplies power to each block of the car navigation device 920 illustrated in FIG. 13 via a power supply line partially indicated by a broken line in FIG. 13. Further, the battery 938 stores power supplied from the vehicle.

In the car navigation device 920 illustrated in FIG. 13, one or more components (the measurement report unit 241 and/or the communication processing unit 243) included in the control unit 240 described with reference to FIG. 4 may be implemented in the radio communication interface 933. Alternatively, at least some of these components may be implemented in the processor 921. As an example, in the car navigation device 920, a module including a part (for example, the BB processor 934) of the radio communication interface 933 or the entire radio communication interface 933, and/or the processor 921 may be mounted, and the one or more components may be implemented in the module. In this case, the module may store a program for causing a processor to function as the one or more components (in other words, a program for causing a processor to performs the operations of the one or more components) and execute the program. As another example, a program for causing a processor to function as the one or more components may be installed in the car navigation device 920, and the radio communication interface 933 (for example, the BB processor 934) and/or the processor 921 may execute the program. As described above, the car navigation device 920 or the module may be provided as a device including the one or more components, and a program for causing a processor to function as the one or more components may be provided. Further, a readable recording medium on which the program is recorded may be provided.

Further, in the car navigation device 920 illustrated in FIG. 13, for example, the radio communication unit 220 described with reference to FIG. Z may be implemented in the radio communication interface 933 (for example, the RF circuit 935). Further, the antenna unit 210 may be implemented in the antenna 937. Further, the storage unit 230 may be implemented in the memory 922.

Further, the technology according to the present disclosure may be implemented as an in-vehicle system (or vehicle) 940 including one or more blocks of the above-described car navigation device 920, the in-vehicle network 941, and a vehicle module 942. The vehicle module 942 generates data on the vehicle, such as a vehicle speed, an engine speed, or failure information, and outputs the generated data to the in-vehicle network 941.

5. Summary

The embodiment of the present disclosure has been described above in detail with reference to FIGS. 1, 2A, 2B, 2C, 3, 4, 5, 6, 7, 8, 9, 10, 11, 12, and 13. As described above, the base station device 100 according to the present embodiment transmits, to another base station device 100 operated by an operator different from an operator operating the base station device 100, configuration information of a guaranteed resource that can be preferentially used by the base station device 100 among radio resources that can be shared between operators. As the configuration information is transmitted to the other base station device 100, the other base station device 100 restricts its own use of the guaranteed resource. As a result, the base station device 100 can preferentially use the guaranteed resource. In this manner, a plurality of base station devices operated by different operators, respectively, can share a radio resource while cooperating with each other.

Hereabove, the preferred embodiment of the present disclosure has been described above in detail with reference to the accompanying drawings, but the technical scope of the present disclosure is not limited to such examples. It is apparent that a person having ordinary knowledge in the technical field of the present disclosure can come up with various changes or modifications within the scope of the technical idea described in the claims, and it is naturally understood that the changes or modifications are also within the technical scope of the present disclosure.

Further, the processing described with reference to the flowcharts and the sequence diagrams in the present specification does not necessarily have to be performed in the illustrated order. Some processing steps may be performed in parallel. Further, additional processing steps may be employed, and some processing steps may be omitted.

Further, the effects described in the present specification are merely illustrative or exemplary, and are not restrictive. That is, the technology according to the present disclosure can exhibit other effects that are obvious to those skilled in the art from the description in the present specification, in addition to or instead of the above effects.

Note that the following configurations are also within the technical scope of the present disclosure.

(1)

A base station device comprising:

a control unit that transmits, to another base station device operated by a second operator different from a first operator operating the base station device, first configuration information of a first guaranteed resource that is preferentially usable by the base station device among radio resources that are sharable between the first operator and the second operator.

(2)

The base station device according to (1), wherein the first configuration information includes at least one of a time of the first guaranteed resource, a frequency of the first guaranteed resource, or information indicating a place where configuration of the first guaranteed resource is effective.

(3)

The base station device according to (1) or (2), wherein the first configuration information includes information indicating a type of the first guaranteed resource corresponding to a signal transmitted and received using the first guaranteed resource.

(4)

The base station device according to any one of (1) to (3), wherein the first configuration information includes information indicating a type of the first guaranteed resource corresponding to a procedure for access to the first guaranteed resource permitted to the other base station device.

(5)

The base station device according to any one of (1) to (4), wherein the control unit transmits the first configuration information to the other base station device, while including, in a radio signal, the first configuration information.

(6)

The base station device according to any one of (1) to (5), wherein the control unit configures the first guaranteed resource and generates the first configuration information.

(7)

The base station device according to (6), wherein the control unit configures the first guaranteed resource based on a result of measurement of a signal from the other base station device performed by a terminal device that performs communication with the base station device.

(8)

The base station device according to any one of (1) to (7), wherein the control unit controls transmission and reception of a signal on the first guaranteed resource based on a response indicating whether or not to accept the preferential use of the first guaranteed resource by the base station device, the response being received from the other base station device.

(9)

The base station device according to any one of (1) to (8), wherein the first guaranteed resource is configured in advance.

(10)

The base station device according to any one of (1) to (9), wherein the first guaranteed resource is configured when there is a signal to be transmitted and received using the first guaranteed resource.

(11)

The base station device according to any one of (1) to (10), wherein the first guaranteed resource is configured again in a case where the base station device fails to use the first guaranteed resource.

(12)

The base station device according to any one of (1) to (11), wherein the control unit receives, from the other base station device, second configuration information of a second guaranteed resource that is preferentially usable by the other base station device among the radio resources, and restricts a use of the second guaranteed resource based on the received second configuration information.

(13)

The base station device according to (12), wherein in a case where a currently used radio resource and the second guaranteed resource overlap each other, the control unit stops using the radio resource in an overlapping portion.

(14)

The base station device according to (13), wherein the control unit does not use the second guaranteed resource.

(15)

The base station device according to (13), wherein the control unit uses the second guaranteed resource after performing carrier sensing.

(16)

The base station device according to any one of (12) to (15), wherein the control unit performs negotiation for configuring the second guaranteed resource with the other base station device.

(17)

The base station device according to (16), wherein the control unit transmits, to the other base station device, information indicating the radio resource requested not to be configured as the second guaranteed resource, or information indicating the radio resource permitted to be configured as the second guaranteed resource.

(18)

The base station device according to (16) or (17), wherein the control unit transmits, to the other base station device, information requesting a change of the second guaranteed resource.

(19)

A terminal device comprising:

a control unit that performs communication with a base station device operated by a first operator by using a radio resource that is sharable between the first operator and a second operator different from the first operator, and reports, to the base station device, a result of measurement of a signal from another base station device operated by the second operator.

(20)

A method performed by a base station device, the method comprising:

transmitting, to another base station device operated by a second operator different from a first operator operating the base station device, first configuration information of a first guaranteed resource that is preferentially usable by the base station device among radio resources that are sharable between the first operator and the second operator.

REFERENCE SIGNS LIST

1 SYSTEM
11 CELL
20 CORE NETWORK
30 PDN
100 BASE STATION DEVICE
102 PART
110 ANTENNA UNIT
120 RADIO COMMUNICATION UNIT
130 NETWORK COMMUNICATION UNIT
140 STORAGE UNIT
150 CONTROL UNIT
151 CONFIGURATION UNIT
153 COMMUNICATION PROCESSING UNIT
200 TERMINAL DEVICE
210 ANTENNA UNIT
220 RADIO COMMUNICATION UNIT
230 STORAGE UNIT
240 CONTROL UNIT
241 MEASUREMENT REPORT UNIT
243 COMMUNICATION PROCESSING UNIT

The invention claimed is:

1. A first base station device, comprising:
circuitry configured to:
transmit, to a second base station device operated by a second operator different from a first operator that operates the first base station device, first configuration information of a first guaranteed resource of a plurality of radio resources, wherein
the first guaranteed resource is preferentially usable by the first base station device among the plurality of radio resources, and
the plurality of radio resources is sharable between the first operator and the second operator;
receive, from the second base station device, a response indicating rejection of the preferential use of the first guaranteed resource, wherein the response is received based on the transmitted first configuration information; and
configure the first guaranteed resource based on the received response.

2. The first base station device according to claim 1, wherein the first configuration information includes at least one of a time of the first guaranteed resource, a frequency of the first guaranteed resource, or information indicating a coverage range of the first base station device.

3. The first base station device according to claim 1, wherein
the first configuration information includes information indicating a type of the first guaranteed resource, and
the type of the first guaranteed resource corresponds to a signal transmitted and received using the first guaranteed resource.

4. The first base station device according to claim 1, wherein
the first configuration information includes information indicating a type of the first guaranteed resource, and
the type of the first guaranteed resource corresponds to a procedure for access to the first guaranteed resource permitted to the second base station device.

5. The first base station device according to claim 1, wherein the circuitry is further configured to transmit a radio signal including the first configuration information to the second base station device.

6. The first base station device according to claim 1, wherein the circuitry is further configured to generate the first configuration information based on the first guaranteed resource.

7. The first base station device according to claim 6, wherein
the circuitry is further configured to configure the first guaranteed resource based on a result of measurement of a signal from the second base station device, and
a terminal device communicates with the first base station device and performs the measurement of the signal.

8. The first base station device according to claim 1, wherein the circuitry is further configured to control transmission and reception of a signal based on the configured first guaranteed resource.

9. The first base station device according to claim 1, wherein the first guaranteed resource is configured in advance.

10. The first base station device according to claim 1, wherein the circuitry is further configured to configure the first guaranteed resource based on a signal to be transmitted and received using the first guaranteed resource.

11. The first base station device according to claim 1, wherein the circuitry is further configured to reconfigure the first guaranteed resource in a case where the first base station device fails to use the first guaranteed resource.

12. The first base station device according to claim 1, wherein the circuitry is further configured to:
- receive, from the second base station device, second configuration information of a second guaranteed resource of the plurality of radio resources, wherein the second guaranteed resource is preferentially usable by the second base station device among the plurality of radio resources; and
- restrict a use of the second guaranteed resource based on the received second configuration information.

13. The first base station device according to claim 12, wherein in a case where a currently used radio resource of the plurality of radio resources and the second guaranteed resource overlap each other, the circuitry is further configured to stop use of the currently used radio resource in an overlapping portion.

14. The first base station device according to claim 13, wherein the circuitry is further configured to stop the use of the second guaranteed resource in the case where the currently used radio resource and the second guaranteed resource overlap each other.

15. The first base station device according to claim 13, wherein the circuitry is further configured to execute carrier sensing and use the second guaranteed resource after the execution of the carrier sensing.

16. The first base station device according to claim 12, wherein the circuitry is further configured to perform negotiation for configuration of the second guaranteed resource with the second base station device.

17. The first base station device according to claim 16, wherein the circuitry is further configured to transmit, to the second base station device, one of information indicating a first radio resource of the plurality of radio resources requested not to be configured as the second guaranteed resource, or information indicating a second radio resource of the plurality of radio resources permitted to be configured as the second guaranteed resource.

18. The first base station device according to claim 16, wherein the circuitry is further configured to transmit, to the second base station device, information requesting a change of the second guaranteed resource.

19. A terminal device, comprising:
circuitry configured to:
- communicate with a first base station device by using a guaranteed resource of a plurality of radio resources, wherein
  - the first base station device is operated by a first operator,
  - the guaranteed resource is preferentially usable by the first base station device among the plurality of radio resources, and
  - the plurality of radio resources is sharable between the first operator and a second operator different from the first operator;
- measure a signal from a second base station device operated by the second operator; and
- report, to the first base station device, a result of the measurement of the signal,
  wherein the first base station device:
  - transmits configuration information of the guaranteed resource to the second base station device based on the result of the measurement of the signal,
  - receives, from the second base station device, a response indicating rejection of the preferential use of the guaranteed resource, wherein the response is received based on the transmitted configuration information, and
  - configures the guaranteed resource based on the received response.

20. A method performed by a first base station device, the method comprising:
- transmitting, to a second base station device operated by a second operator different from a first operator operating the first base station device, configuration information of a guaranteed resource of a plurality of radio resources, wherein
  - the guaranteed resource is preferentially usable by the first base station device among the plurality of radio resources, and
  - the plurality of radio resources is sharable between the first operator and the second operator;
- receiving, from the second base station device, a response indicating rejection of the preferential use of the guaranteed resource, wherein the response is received based on the transmitted configuration information; and
- configuring the guaranteed resource based on the received response.

* * * * *